United States Patent
Miller et al.

(10) Patent No.: US 12,416,233 B2
(45) Date of Patent: Sep. 16, 2025

(54) ENHANCED MEASUREMENT-WHILE-DRILLING DECODING USING ARTIFICIAL INTELLIGENCE

(71) Applicant: ERDOS MILLER, INC., Houston, TX (US)

(72) Inventors: Kenneth Miller, Houston, TX (US); David Erdos, Houston, TX (US); Abraham Erdos, Houston, TX (US)

(73) Assignee: ERDOS MILLER, INC., Houston, TX (US)

( * ) Notice: Subject to any disclaimer, the term of this patent is extended or adjusted under 35 U.S.C. 154(b) by 202 days.

(21) Appl. No.: 18/021,917

(22) PCT Filed: Aug. 19, 2021

(86) PCT No.: PCT/US2021/046633
§ 371 (c)(1),
(2) Date: Feb. 17, 2023

(87) PCT Pub. No.: WO2022/040393
PCT Pub. Date: Feb. 24, 2022

(65) Prior Publication Data
US 2023/0332498 A1   Oct. 19, 2023

Related U.S. Application Data

(60) Provisional application No. 63/068,176, filed on Aug. 20, 2020.

(51) Int. Cl.
E21B 47/18   (2012.01)

(52) U.S. Cl.
CPC .......... *E21B 47/18* (2013.01); *E21B 2200/22* (2020.05)

(58) Field of Classification Search
None
See application file for complete search history.

(56) References Cited

U.S. PATENT DOCUMENTS

| | | |
|---|---|---|
| 2016/0003035 A1 | 1/2016 | Logan et al. |
| 2017/0147570 A1 | 5/2017 | Simske et al. |
| 2018/0238164 A1 | 8/2018 | Jamison et al. |
| 2021/0148217 A1* | 5/2021 | Walker .................. G01V 1/305 |
| 2022/0195868 A1* | 6/2022 | Chen ..................... G06N 20/00 |

OTHER PUBLICATIONS

Notification Concerning Transmittal of Copy of International Preliminary Report of Patentability (IPRP) dated Mar. 2, 2023 (Mar. 2, 2023) issued on related international patent application PCT/US2021/046633 issued by the International Bureau of WIPO.

* cited by examiner

*Primary Examiner* — Curtis A Kuntz
*Assistant Examiner* — Jerold B Murphy
(74) *Attorney, Agent, or Firm* — Dickinson Wright PLLC

(57) ABSTRACT

In one embodiment, a method is disclosed for using a trained machine learning model to classify mud pulse signals. The method may include receiving a mud pulse signal from a measurement while drilling (MVWD) tool, wherein the mud pulse signal includes data. The method may also include decoding, using the trained machine learning model, the data to determine a value of the data, and providing a user interface comprising the value of the data for presentation on a computing device of a user.

19 Claims, 14 Drawing Sheets

ENHANCED MEASUREMENT-WHILE-DRILLING DECODING USING ARTIFICIAL INTELLIGENCE

CROSS-REFERENCE TO RELATED APPLICATIONS

The present application is a U.S. National Phase patent application of and claims priority to PCT/US2021/046633, filed Aug. 19, 2021, which claims priority to and the benefit of U.S. Prov. Pat. App. 63/068,176, filed Aug. 20, 2020, titled "Enhanced Measurement While-Drilling Decoding Using Artificial Intelligence". The contents of the above-referenced applications are incorporated herein by reference in their entireties for all purposes.

TECHNICAL FIELD

This disclosure relates generally to measurement-while-drilling (MWD) data and, in particular, to enhanced MWD decoding using artificial intelligence.

BACKGROUND

One problem encountered with MWD data provided by mud pulse (MP) telemetry and/or electromagnetic (EM) telemetry is signal integrity. In particular, the conditions in a well borehole may change frequently such that dynamic forces are generated that effect a signal transmitted from a downhole device. The effects on the signal may impact the integrity of the signal and cause accurately decoding the signal to be quite difficult.

SUMMARY

In one embodiment, a method is disclosed for using a trained machine learning model to classify mud pulse signals. The method may include receiving a mud pulse signal from a measurement while drilling (MWD) tool, wherein the mud pulse signal includes data. The method may also include decoding, using the trained machine learning model, the data to determine a value of the data, and providing a user interface comprising the value of the data for presentation on a computing device of a user.

In one embodiment, a tangible, non-transitory computer-readable medium may store instructions that, when executed, cause a processing device to perform any of the methods, operations, and/or functions described herein.

In one embodiment, a system may include a memory device storing instructions, and a processing device communicatively coupled to the memory device. The processing device may execute the instructions to perform any of the methods, operations, and/or functions described herein.

Other technical features may be readily apparent to one skilled in the art from the following figures, descriptions, and claims. These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and in the claims, the singular form of 'a', 'an', and 'the' include plural referents unless the context clearly dictates otherwise.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 14, discussed below, and the various embodiments used to describe the principles of this disclosure are by way of illustration only and should not be construed in any way to limit the scope of the disclosure.

Techniques for enhanced MWD decoding using artificial intelligence are disclosed.

Figure 1:
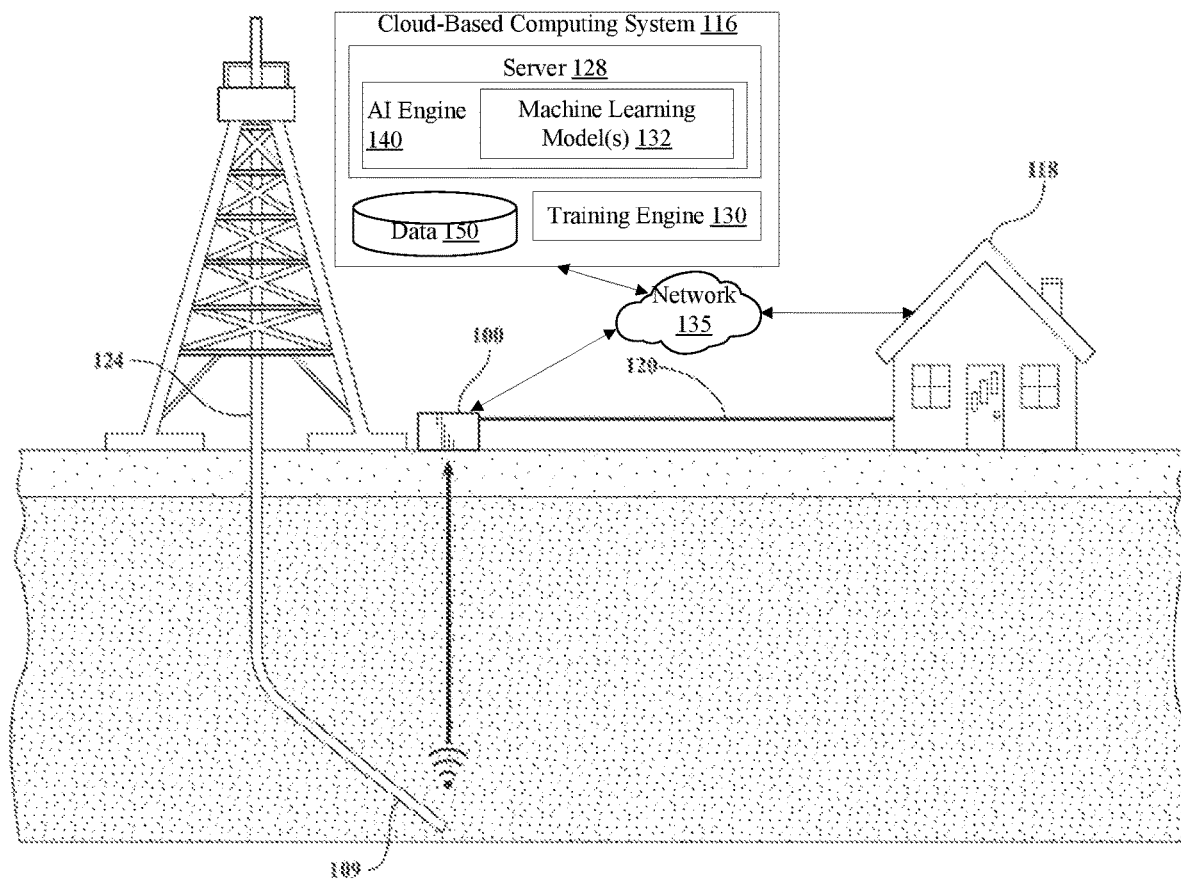
FIG. 1 is an illustration of a MWD system in a well sending data to a MWD data acquisition system, according to embodiments of the disclosure.

FIG. 1 shows the MWD data acquisition system 100 as placed next to an oil rig. The MWD data acquisition system 100 includes at least one data reception device. In some embodiments, there may be more than one data reception device. The data reception device may include various components, such as an analog data reception circuit configured to receive analog MWD data from an MWD tool 109, an analog-to-digital conversion circuit configured to convert the analog MWD data to digital MWD data, a data transmission circuit configured to transmit analog and/or digital data to a surface computing device 118. The MWD tool 109 may be included in a tool drillstring with various other components, such as a drill bit, a pump, and the like. The MWD tool 109 may include various sensors configured to obtain any suitable measurement pertaining to a drilling operation, a component of a tool drillstring (e.g., MWD tool 109, a drill bit, a pump, etc.), a formation in which the tool drillstring is disposed, or some combination thereof. For example, the sensors may include one or more gamma ray sensors, thermometers, accelerometers, imaging devices, pressure sensors, etc. Any suitable sensors may be used by the MWD tool 109 to obtain various geological characteristics such as density, porosity, resistivity, acoustic-caliper, inclination at the drill bit (NBI), magnetic resonance and/or formation pressure. Any suitable sensors may be used by the MWD tool 109 to obtain various directional information (hole inclination, azimuth, tool facing), drilling parameters (bottomhole temperature, pressure, torque, weight-on-bit, revolutions per minute), rig safety data, formation evaluation and correlation data (formation resistivity, gamma-ray and sonic logs), etc. The MWD tool 109 may be configured to obtain and evaluate measurements while a well is being drilled. Accordingly, directional drilling may be performed based on measured formation properties.

In some embodiments, the surface computing device 118 may be local or remote from the MWD data acquisition system 100. For example, the MWD data acquisition system 100 may be locally communicatively connected, via a cable 120, to the surface computing device 118 (also referred to herein as the surface processor 118) or the MWD data acquisition system 100 may be remotely communicatively coupled, via a network 135, to the surface computing device 118. In some embodiments, the MWD data acquisition system 100 may be included as a component of the surface computing device 118. In some embodiments, the MWD data acquisition system 100 may include or be coupled to a component (e.g., pressure transducer) configured to receive the data sent from the MWD tool 109. In some embodiments, the MWD data acquisition system 100 is configured to transmit digital data to a surface computing device 118 via the cable 120 using, for example, one of the following cable and communication standards: RS-232, RS-422, RS-485, Ethernet, USB, or CAN bus. Network 135 may be a public network (e.g., connected to the Internet via wired (Ethernet) or wireless (WiFi)), a private network (e.g., a local area network (LAN) or wide area network (WAN)), or a combination thereof. Network 135 may also comprise a node or nodes on the Internet of Things (IoT).

The MWD tool 109 may be programmed with information such as which measurements to take and which data to transmit back to the surface. The MWD tool 109 may include a downhole processor. Communicating data between the downhole processor and a surface processor (e.g., included in the surface computing device 118) may be performed using various types of telemetry. For example, mud pulse (MP) telemetry and/or electromagnetic (EM) telemetry. However, the quality of the signal transmitted by the MWD tool 109 may vary as the conditions in the well borehole change (e.g., mud moves around and/or is added to the well borehole), thereby causing distortions and/or noise in the signal representing measurement data. Thus, technical benefits of the disclosed techniques include improving the accuracy of decoding the signals received from the MWD tool 109 by using artificial intelligence to continuously or continually train one or more machine learning models with updated input received via a user interface of the surface computing device 118.

In some embodiments, a cloud-based computing system 116 may be communicatively coupled, via the network 135, to the surface computing device 118 and/or the MWD data acquisition system 100. Each of the components included in the cloud-based computing system 116, the surface computing device 118, and/or the MWD data acquisition system 100 may include one or more processing devices, memory devices, and/or network interface cards. The network interface cards may enable communication via a wireless protocol for transmitting data over short distances, such as Bluetooth, ZigBee, NFC, etc. Additionally, the network interface cards may enable communicating data over long distances.

The surface computing device 118 may be any suitable computing device, such as a laptop, tablet, smartphone, or computer. The surface computing device 118 may include a display capable of presenting a user interface of an application. The application may be implemented in computer instructions stored on the one or more memory devices of the surface computing device 118 and executable by the one or more processing devices of the surface computing device 118. The application may present various user interfaces that present various signals (e.g., mud pulse and/or electromagnetic) to a user. The user interfaces may include graphical elements that enable a user to reposition portions of a signal to identify a correct value represented by the signal, identify a correct synchronization signal included in the signal, and so forth. For example, the user interfaces may enable directly modifying a value of a signal at a bit level and/or the word level by entering a correct value into a text box or any suitable graphical element. In some embodiments, the user interface may enable repositioning and/or reconfiguring a portion of the signal to change a value of data represented by the signal. As described further below, any modifications to the received signal may be saved as an updated signal and used to update a trained machine learning model to classify subsequently received signals similar to the updated signal (e.g., output the same value for the subsequently received signal that is similar to the updated signal). The surface computing device 118 may also include instructions stored on the one or more memory devices that, when executed by the one or more processing devices of the surface computing device 118, perform operations of any of the methods described herein.

In some embodiments, the cloud-based computing system 116 may include one or more servers 128 that form a distributed computing architecture. The servers 128 may be a rackmount server, a router computer, a personal computer, a portable digital assistant, a mobile phone, a laptop computer, a tablet computer, a camera, a video camera, a netbook, a desktop computer, a media center, any other device capable of functioning as a server, or any combination of the above. Each of the servers 128 may include one or more processing devices, memory devices, data storage, and/or network interface cards. The servers 128 may be in communication with one another via any suitable communication protocol. The servers 128 may execute an artificial intelligence (AI) engine 140 that uses one or more machine learning models 132 to perform at least one of the embodiments disclosed herein. The cloud-based computing system 128 may also include a database 150 that stores data, knowledge, and data structures used to perform various embodiments. For example, the database 150 may store a corpus of signals (e.g., MP and/or EM) including their pulse patterns, identified synchronization signals, and/or values (e.g., for bits and/or words). The database 150 may receive updated data that includes additional signals (e.g., MP and/or EM) including pulse patterns, modified synchronization signals, and/or modified values. Further, the database 150 may include data representing signals including various noise signatures, ideal signals, and the like. The data may be labeled (e.g., noise signatures labeled, synchronization signals labeled, peaks labeled as certain values within time window frames, etc.). The data stored in the database 150 may represent training data, in some embodiments. The training data may be used to train the machine learning models 132.

In some embodiments the cloud-based computing system 116 may include a training engine 130 capable of generating the one or more machine learning models 132. The machine learning models 132 may be trained to receive signals, identify synchronization signals in the signals, and decode data following the synchronization signals to output one or more values of the data, among other things. The machine learning models 132 may be trained to receive unfiltered signals and to filter the unfiltered signals to generate filtered signals (e.g., by removing noise, cancelling echoes, etc.). The machine learning models 132 may be trained to decode the signals. The one or more machine learning models 132 may be generated by the training engine 130 and may be implemented in computer instructions executable by one or more processing devices of the training engine 130 and/or the servers 128. To generate the one or more machine learning models 132, the training engine 130 may train the one or more machine learning models 132.

The training engine 130 may be a rackmount server, a router computer, a personal computer, a portable digital assistant, a smartphone, a laptop computer, a tablet computer, a netbook, a desktop computer, an Internet of Things (IoT) device, any other desired computing device, or any combination of the above. The training engine 130 may be cloud-based, be a real-time software platform, include privacy software or protocols, and/or include security software or protocols.

To generate the one or more machine learning models 132, the training engine 130 may train the one or more machine learning models 132. The training engine 130 may use a base dataset of signals (e.g., MP and/or EM) and labels that classify the synchronization signature in the signals, the values represented by data in the signals, and/or noise signatures in the signals. For example, the signals may include various pulse patterns that are predetermined to be synchronization signals, where such pulse patterns may be labeled as synchronization signals. Further, the signals may include various pulse patterns that are predetermined to represent certain values, where such pulse patterns may be labeled to be those certain values.

The one or more machine learning models 132 may refer to model artifacts created by the training engine 130 using training data that includes training inputs and corresponding target outputs. The training engine 130 may find patterns in the training data wherein such patterns map the training input to the target output and generate the machine learning models 132 that capture these patterns. Although depicted separately from the server 128, in some embodiments, the training engine 130 may reside on server 128. Further, in some embodiments, the artificial intelligence engine 140, the database 150, and/or the training engine 130 may reside on the computing device 102.

As described in more detail below, the one or more machine learning models 132 may comprise, e.g., a single level of linear or non-linear operations (e.g., a support vector machine [SVM]) or the machine learning models 132 may be a deep network, i.e., a machine learning model comprising multiple levels of non-linear operations. Examples of deep networks are neural networks, including generative adversarial networks, convolutional neural networks, recurrent neural networks with one or more hidden layers, and fully connected neural networks (e.g., each neuron may transmit its output signal to the input of the remaining neurons, as well as to itself). For example, the machine learning model may include numerous layers and/or hidden layers that perform calculations (e.g., dot products) using various neurons. In some embodiments, one or more of the machine learning models 132 may be long short-term memory (LSTM), which is an artificial recurrent neural network architecture that uses feedback connections. It can not only process single data points, but also entire sequences of data (e.g., a signal of MWD telemetry data).

Figure 2:
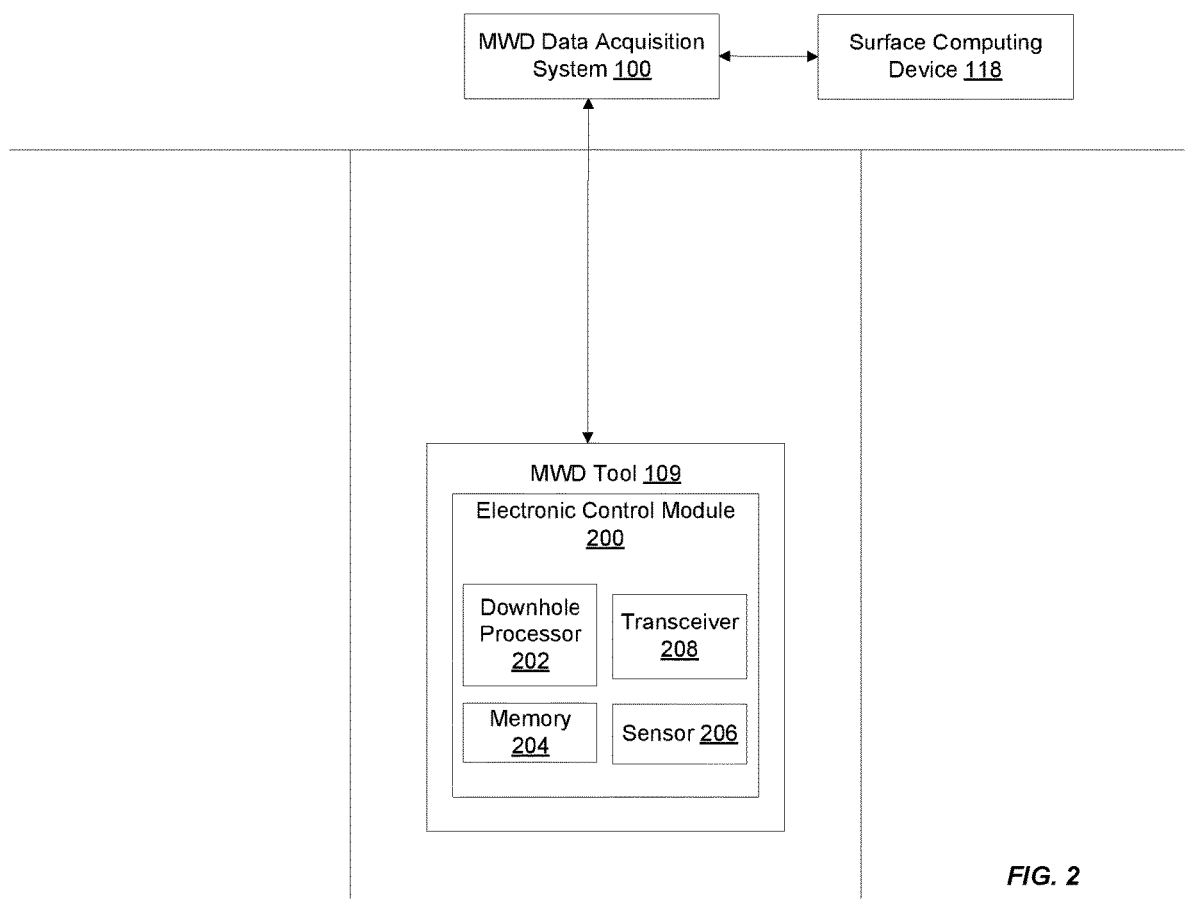
FIG. 2 is a block diagram of various electronic components included in an electronic control module, according to embodiments of the disclosure.

FIG. 2 is a block diagram of various electronic components included in an electronic control module 200 of a MWD tool 109, according to embodiments of the disclosure. The electronic control module 200 may include various electronic components, such as the downhole processor 202, a memory 204, a sensor 206, and/or transceiver 208 (e.g., capable of transmitting messages via mud pulse and/or electromagnetic telemetry), among other suitable components. The MWD tool 109 may be communicatively coupled to the MWD data acquisition system 100 when the MWD tool 109 is in operation (e.g., downhole). The MWD data acquisition system 100 may be communicatively coupled to the surface computing device 118. Although depicted as separate and distinct components in FIG. 2, it should be understood that, in some embodiments, the MWD data acquisition system 100 is a component within the surface computing device 118. In some embodiments, the surface computing device 118 and the MWD data acquisition system 100 may be located relatively closely to the well borehole including the MWD tool 109.

The downhole processor 202 may be configured to transmit messages via a wireless protocol in various transmission modes. For example, the downhole processor 202 may command the transceiver 208 to transmit mud pulse messages when operating in a mud pulse mode. The downhole processor 202 may command the transceiver 208 to transmit electromagnetic (EM) messages when operating in an EM mode. Mud pulse mode is able to operate over a wider range of lithological conditions due to its formation independence. Mud pulse telemetry may refer to a system of using valves to modulate the flow of drilling fluid in a bore of the drillstring. The valve restriction can generate a pressure pulse that propagates up the column of fluid inside the drillstring and then can be detected by pressure transducers at the MWD data acquisition system 100. The EM mode enables data transmission without a continuous fluid column, providing an alternative to negative and positive pulse systems. An EM telemetry system may refer to a system that applies a differential voltage, positive and negative voltage, across an insulative gap in the drill string. The differential voltage causes current to flow through the formation creating equipotential lines that can be detected by sensors at the surface. Due to the formation dependence, EM communication can be hindered by particularly high and low conductivity environments.

The downhole processor 202 may be any suitable processing device, such as one or more general-purpose processing devices such as a microprocessor, central processing unit, or the like. More particularly, the downhole processor 202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The downhole processor 202 may also be one or more special-purpose processing devices such as an application specific integrated circuit (ASIC), a system on a chip, a field programmable gate array (FPGA), a digital signal processor (DSP), network processor, or the like. The downhole processor 202 is configured to execute instructions for performing any of the operations and steps of any of the methods discussed herein. The downhole processor 202 may operate in several transmission modes. For example, the downhole processor 202 may be communicatively coupled with the transceiver 208, the memory 204, and/or the sensor 206.

The memory 204 may be any suitable memory device, such as a tangible, non-transitory computer-readable medium storing instructions. The instructions may implement any operation or steps of any of the methods described herein. The downhole processor 202 may be communicatively coupled to the memory 204 and may execute the instructions to perform any operation or steps of any of the methods described herein.

The sensor 206 may be any suitable sensor. In some embodiments, the sensor 206 may be an accelerometer, pressure, velocity sensor, proximity probe, laser displacement sensor, or any suitable sensor configured to measure vibrations, pressure, or the like. The sensor 206 may obtain vibration measurements and use them to determine an amount of fluid flow. The sensor 206 may transmit the vibration measurements to the downhole processor 202. The downhole processor 1300 and/or the sensor 206 may be configured to determine the amount of fluid flow based on the measurements. In some embodiments, the data received from the sensor 206 may be any suitable MWD data and may be received by the downhole processor 202 and transmitted, via the transceiver 208, to the MWD data acquisition system 100. In some embodiments, the MWD tool 109 may include one or more valves that are actuated by the downhole processor 202 to transmit mud pressure pulses (e.g. mud pulse signals) representing measurements obtained from the sensors 206 to the data acquisition system 100. The mud pressure signals may be received by one or more pressure transducers at the surface.

Figure 3A:
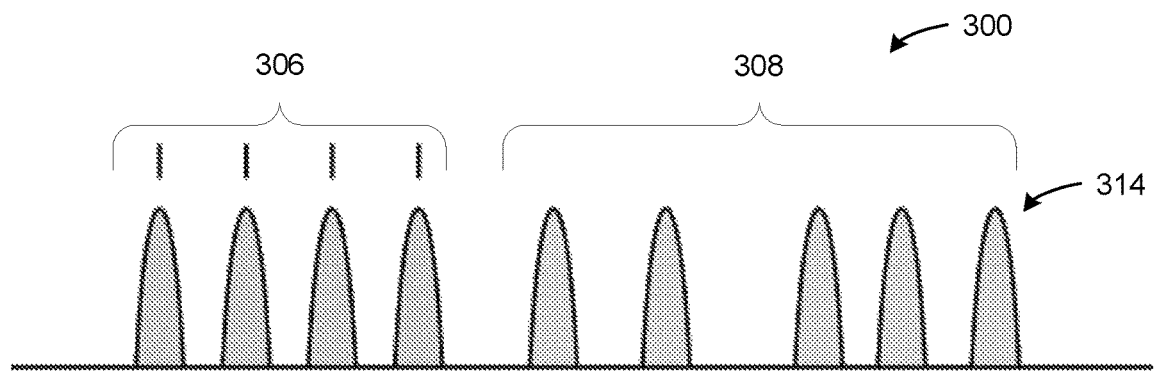
FIGS. 3A-3C illustrate example user interfaces for identifying a synchronization signal within a mud pulse signal, according to embodiments of the disclosure.
Figure 3B:
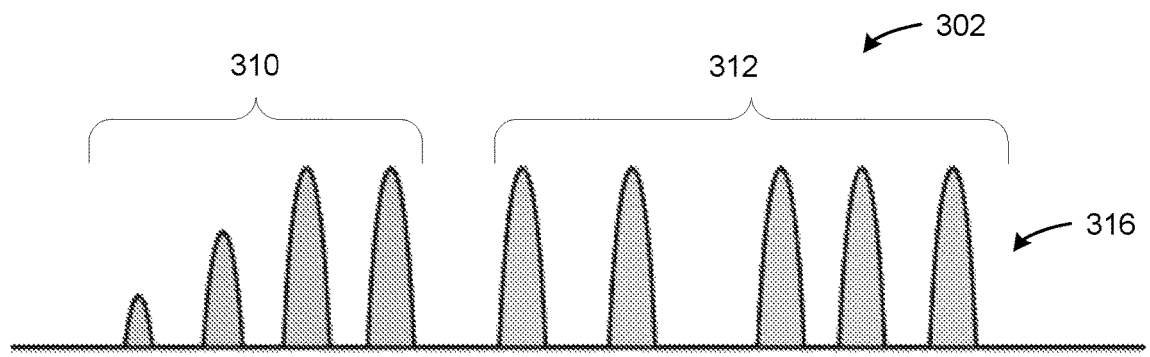
Figure 3C:
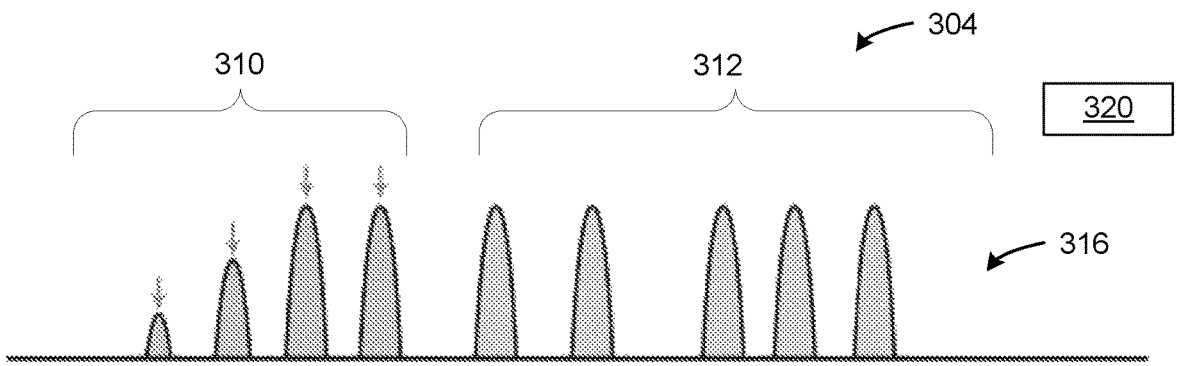

FIGS. 3A-3C illustrate example user interfaces 300, 302, and 304 for identifying a synchronization signal within a mud pulse signal, according to embodiments of the disclosure. The identified synchronization signals may be saved as updated data that is fed back into training data to update the machine learning models 132, as described further herein. The user interfaces 300, 302, and 304 may be presented on a display of the surface computing device 118. The user interfaces 300, 302, and 304 may be used to graphically represent the received mud pulse signals and to provide feedback regarding values and/or synchronization signals using various graphical elements. The feedback may be used to update trained machine learning models 132 to more accurately decode mud pulse signals that are subsequently received. Accordingly, some embodiments of the present disclosure provide for an enhanced graphical user interface that enables using graphical elements to visually edit outputs (e.g., decoded values, identified synchronization signals, etc.) of one or more trained machine learning models 132 to improve the accuracy, efficiency, and/or robustness of the trained machine learning models 132.

FIG. 3A depicts a mud pulse signal 314 that is presented on the user interface 300. The mud pulse signal 314 may have been received by the MWD data acquisition system 100 and input to one or more trained machine learning models 132 that are configured to identify synchronization signals based on training data.

As depicted, the mud pulse signal 314 includes two portions: a synchronization signal 306 and a data signal (e.g., telemetry measurement data). The synchronization signal 306 is sent first in the mud pulse signal 314 to indicate the start of the data signal 314. The synchronization signal 306 may have a particular signature or pattern (e.g., four consecutive pulses having similar characteristics (timing, amplitude, frequency, etc.) when transmitted correctly. The trained machine learning model 132 may use training data to recognize the pattern of the signatures for the synchronization signal and visually identify the synchronization signal in the user interface 300. For example, the synchronization signal 306 is depicted in the user interface 300 as the 4 notches about the 4 pulses of the synchronization signal 306, where the notches indicate the timing of the 4 pulses. After the synchronization signal 306 is identified, the machine learning model 132 may begin decoding the data signal 314. However, noise and/or distortion in the well borehole may cause the synchronization signal to be missed in some instances.

For example, FIG. 3B depicts the user interface 302 showing a mud pulse signal 316 where the synchronization signal 310 is missed. As depicted, there are no indications (e.g., notches) that mark the timing of the 4 pulses in the synchronization signal 310. Accordingly, decoding may not be performed because the beginning of the data signal 312 is undetermined. It should be noted that the mud pulse signals 314 and 316 may be continuously scrolling across the screen of the surface computing device 118 as the mud pulse signals are received from the MWD data acquisition system 100.

In some embodiments, a graphical element 320 (e.g., manual synchronization selection button) may be presented in the user interface 316 of FIG. 3C. The user may select the graphical element 320 to provide an identify the synchronization signal 310. For example, upon selecting the graphical element 320, a paused version of the mud pulse signal 316 may be presented. Further, the data signal 316 including the telemetry measurement data may be buffered in a memory of the surface computing device 318. The paused version may include another graphical element (e.g., template) that overlays the mud pulse signal in its paused state. The template may include various indicators (e.g., the depicted arrows) that may be positioned and aligned with the peaks of the 4 pulses in the synchronization signal 310. In some embodiments, when positioning the arrows, all 4 arrows may move in synchronization and the user may drag them, using a peripheral device (e.g., touchpad, mouse, keyboard, etc.) such that the arrows point at the peaks of the pulses. The identified synchronization signal 310 for the mud pulse signal 316 in FIG. 3C may be saved as updated data (e.g., a data snippet). Based on the selected pulses identified in the synchronization signal 310, the surface computing device 118 may retrieve the buffered data signal and decode the data to determine a value (e.g., any suitable digital value (1, 2, 3, 10, 90, 100, etc.).

In some embodiments, when more than one pulse is detected in a packet, the user interface 500 may enable the user to select which one is the correct pulse. For example, in the packet 502 in FIG. 5, there is a short pulse and a tall pulse. The short pulse may represent a noise signal that is caused by a condition of the well borehole, and the user may use the user interface 500 to select a graphical element that indicates the tall pulse is the correct pulse. The value of the tall pulse may be determined based on which slot it is in the packet 502, and the selected tall pulse including its value may be saved as updated data that may be used to update the trained machine learning model 132.

The updated data may include the pattern of pulses identified as the synchronization signal 310. The updated data may be used, along with original training data, to retrain the machine learning models 132 in order to identify the synchronization signal 310 for subsequent mud pulse signals received.

Figure 4:
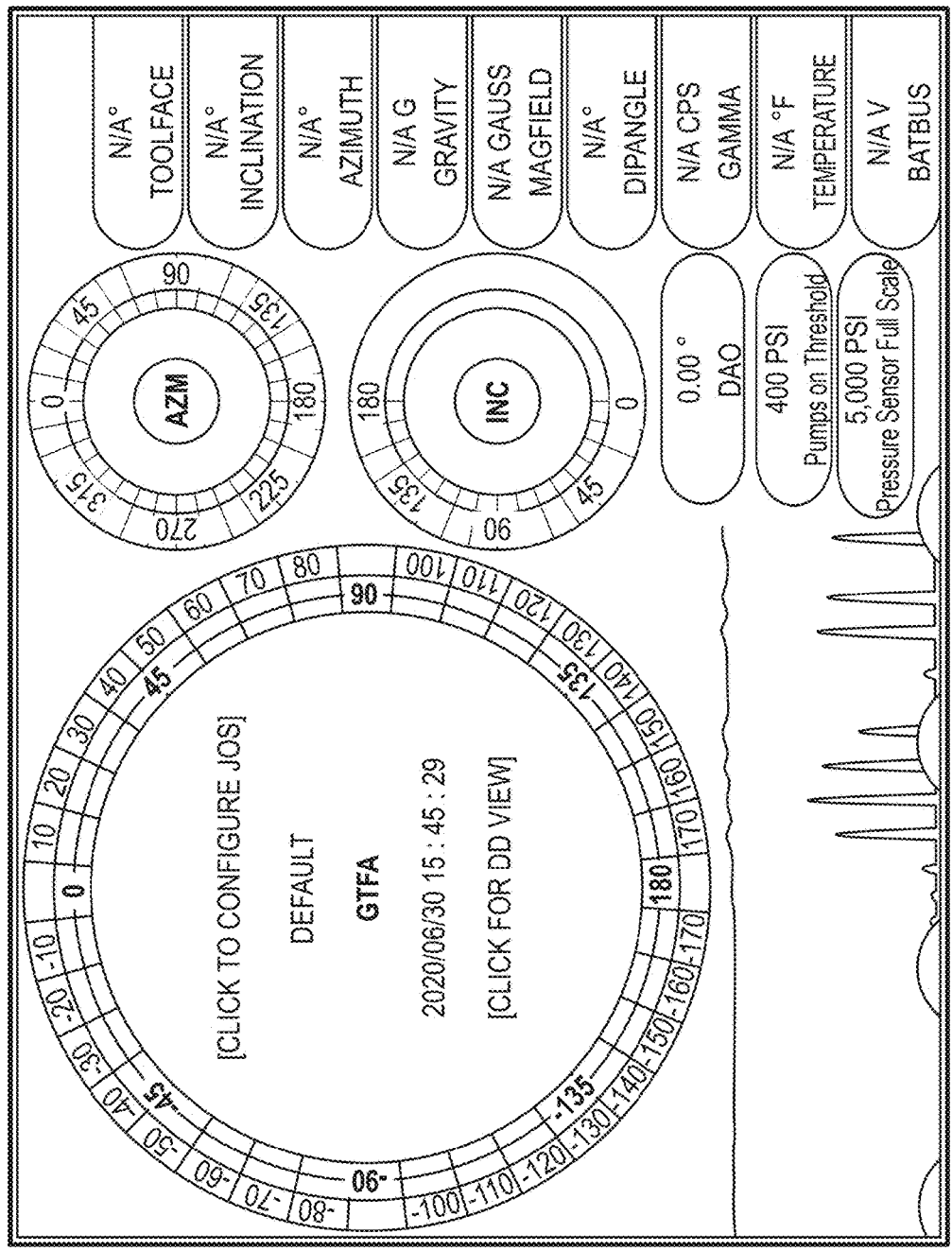
FIG. 4 illustrates another example user interface for identifying a correct synchronization signal within a mud pulse signal, according to embodiments of the disclosure.

FIG. 4 illustrates another example user interface 400 for identifying a correct synchronization signal 400 within a mud pulse signal, according to embodiments of the disclosure. The trained machine learning model 132 may receive the mud pulse signal and be trained to identify the pattern of the synchronization signal 400 (e.g., four pulses having similar characteristics). Further, trained machine learning model 132 may be trained to begin decoding a data signal included in the mud pulse signal after the synchronization signal 400 is identified.

Figure 5:
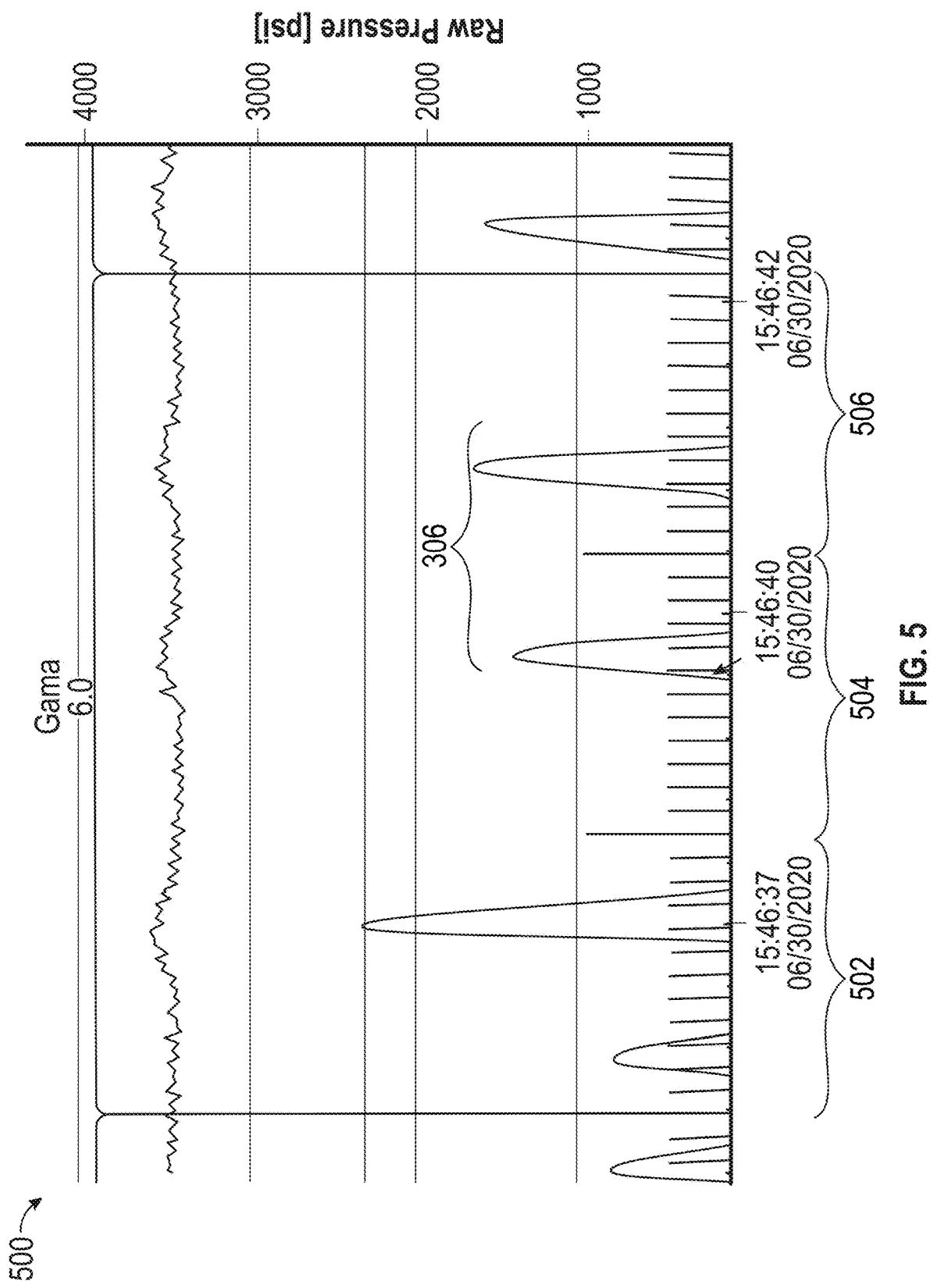
FIG. 5 illustrates an example user interface for identifying a correct bit value within a packet within a gamma word, according to embodiments of the disclosure.

FIG. 5 illustrates an example user interface 500 for identifying a correct bit value within a packet within a gamma word of a mud pulse signal, according to embodiments of the disclosure. The gamma word includes 3 packets 502, 504, and 506. Each packet includes 12 slots, where each slot is correlated with a particular value (e.g., digital value of 1, 2, 3, 4, 5, 6, 7, 8, 9, 10, 11, and 12. The pulses may be placed in various slots by the machine learning model 132 using training data to decode the data in the mud pulse signal to determine values of the data, and then correlating the determined values with the particular slots in the user interface 500.

The user interface 500 may include a graphical element that enables the user to pause the mud pulse signal as it scrolls across the user interface 500 and to drag the pulses of the mud pulse signal into proper slots, thereby changing the value of the pulses. Such a technique may be enable at the bit level within each packet 502, 504, and/or 506 by repositioning individual pulses, and/or at the word level by repositioning multiple pulses at the same time. The repositioned pulses in their new slots may be saved as updated data and may be used as training data to update the machine learning models 132. In some embodiments, another graphical element in the user interface 500 may enable the user to directly enter a value for the data represented in the mud pulse signal on the user interface 500. For example, a digital value for the mud pulse signal may be presented in the user interface 500, and the graphical element may include a textbox that enables the user to change the value and save the changed value as the correct value for the mud pulse signal.

Any of the changes made to the pulses in the slots and/or the value(s) may override the previous output determined by the machine learning model 132 and may be used to update the machine learning model 132 to determine new output when classifying subsequent mud pulse signals.

Figure 6:
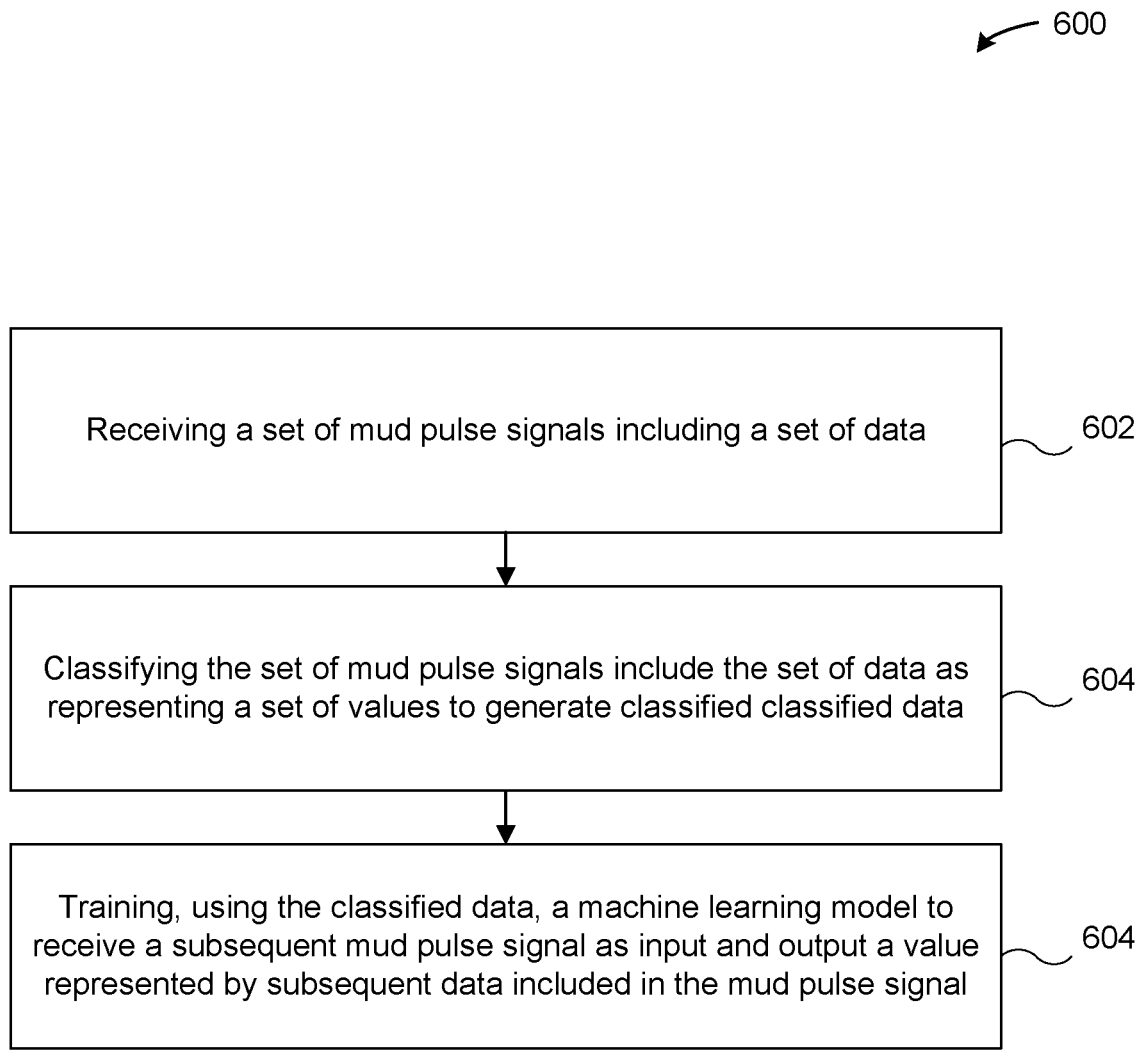
FIG. 6 illustrates a method of training, based on a training dataset, a machine learning model to classify a received mud pulse signal as representing a certain value, according to embodiments of the disclosure.
Figure 7:
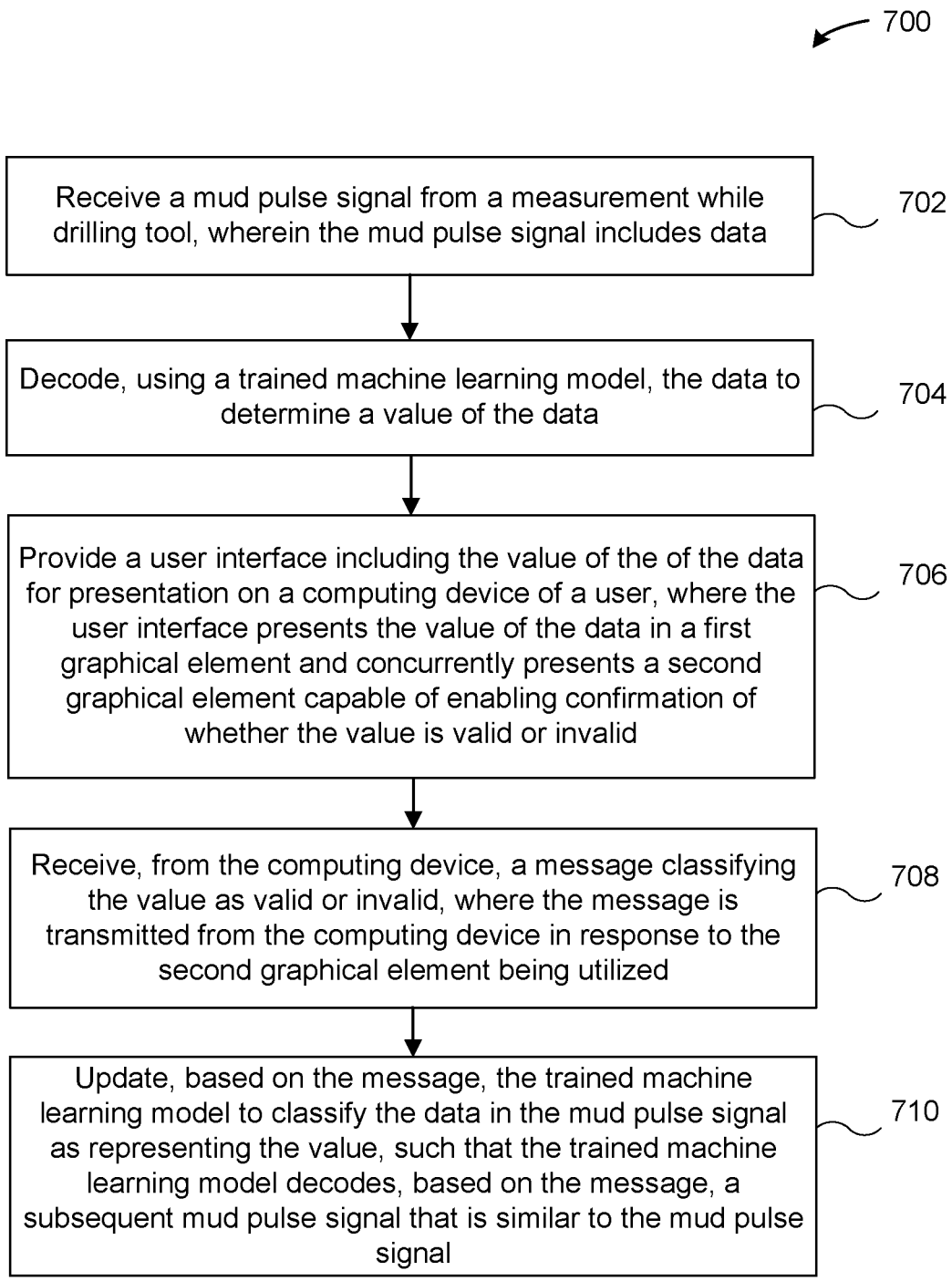
FIG. 7 illustrates a method of using a user interface to receive input pertaining to a previously received mud pulse signal and update a trained machine learning model to classify subsequently received mud pulse signals similarly to the input, according to embodiments of the disclosure.
Figure 8:
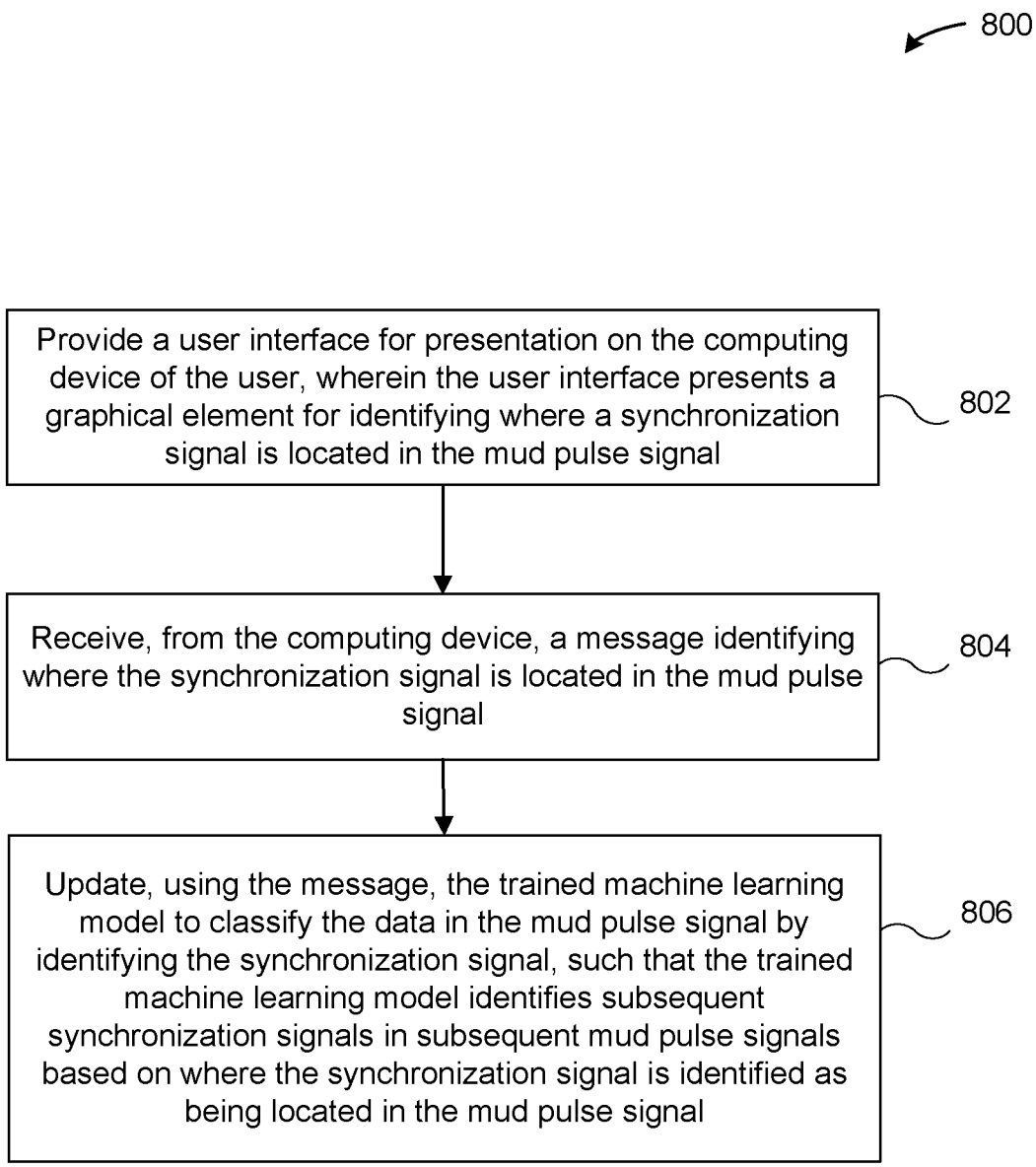
FIG. 8 illustrates a method of using a user interface to enable identifying a correct synchronization signal in a mud pulse signal and update a trained machine learning model based on the correct synchronization signal, according to embodiments of the disclosure.

FIGS. 6-8 describe various methods as disclosed herein. It should be noted, that although the methods generally describe decoding mud pulse signals, the disclosed embodiments may be used to decode EM signals, as well. For example, the electromagnetic modulation in an EM signal is quadrature phase shift keying (QPSK), which is more difficult to decode (e.g., visually) as M-ary (which is pulse position modulation (PPM)) of a MP signal. The machine learning models 132 may be trained using one or more full sine waves for synchronization, which may serve as training data. The EM signals may be presented on the user interface of the surface computing device 118, and a user may use a graphical element to confirm or correct a synchronization signal selected by the machine learning models out of a voltage waveform.

Turning to FIG. 6, it illustrates a method 600 of training, based on a training dataset, a machine learning model to classify a received mud pulse signal as representing a certain value, according to embodiments of the disclosure. The method 600 is performed by processing logic that may include hardware (circuitry, dedicated logic, etc.), software (such as is run on a general-purpose computer system or a dedicated machine), or a combination of both. The method 600 and/or each of its individual functions, routines, subroutines, or operations may be performed by one or more processors of a computing device (e.g., any component of FIG. 1, such as server 128 executing the artificial intelligence engine 140, surface computing device 118, or the like). In certain implementations, the method 600 may be performed by a single processing thread. Alternatively, the method 600 may be performed by two or more processing threads, each thread implementing one or more individual functions, routines, subroutines, or operations of the methods.

For simplicity of explanation, the method 600 is depicted and described as a series of operations. However, operations in accordance with this disclosure can occur in various orders and/or concurrently, and/or with other operations not presented and described herein. For example, the operations depicted in the method 600 may occur in combination with any other operation of any other method disclosed herein. Furthermore, not all illustrated operations may be required to implement the method 600 in accordance with the disclosed subject matter. In addition, those skilled in the art will understand and appreciate that the method 600 could alternatively be represented as a series of interrelated states via a state diagram or events.

At 602, the processing device may receive a set of mud pulse signals including a set of data (e.g., any suitable measurement data, such as pressure). The set of mud pulse signals may represent a corpus of mud pulse signals previously received from one or more MWD tools and stored in a database. The processing device may receive the set of mud pulse signals by accessing the database and retrieving the set of mud pulse signals, in one embodiment. In some embodiments, the processing device may receive the set of mud pulse signals from any suitable source (e.g., a communicatively coupled device, the Internet, etc.).

At 604, the processing device may classify the set of mud pulse signals including the set of data as representing a set of values to generate classified data. Each of the mud pulse signals may include two portions, a synchronization signal and a data signal. In some embodiments, the classification may be performed by receiving input from a user interface where the input identifies a decoded value each pulse pole in the mud pulse signal represents either at a bit level and/or word level. In some embodiments, the classification may be performed using a procedural techniques that decodes the value of each pulse pole based on characteristic of the mud pulse signal (e.g., the height or width of one or more pulse poles within each packet of a data signal of the mud pulse signal, etc.). The classification may also identify where the synchronization signals are located in the mud pulse signal. The classified data may include labels that identify, in each example mud pulse signal, where a synchronization signal is located, decoded values of data at a bit level in the data signal, and/or decoded values of data at a word level in the data signal. Such classified data may enable one or more technical benefits, such as enhancing accuracy (e.g., fewer errors by identifying correct synchronization signals and beginning decoding a data signal at a proper location, as well as correctly decoding the data included in the data signal) and/or efficiency of decoding subsequently received mud pulse signals.

At 604, the processing device may train, using the classified data, one or more machine learning models 132. The training engine 130 may train the one or more machine learning models 132. For example, one machine learning model 132 may be trained to receive a mud pulse signal as input, decode the data in the mud pulse signal, and output a value (e.g., per bit, per multiple bits, and/or per word) represented by the data. In another example, one machine learning model 132 may be trained to receive a mud pulse signal as input, identify a synchronization signal in the mud pulse signal, and output a location of the synchronization signal. The output of the location of the synchronization signal may be input with the mud pulse signal into the machine learning model 132 trained to decode the value of the data. In such an instance, the machine learning model 132 may use the location of the synchronization signal to begin decoding the data signal. In some embodiments, a signal machine learning model 132 may be trained to receive the mud pulse signal, identify a location of the synchronization signal, begin decoding data included in the mud pulse signal after the location of the synchronization signal, and output a value (e.g., per bit, per multiple bits, and/or per word) represented by the data. It should be understood that any combination of machine learning models 132 may be trained and used to perform the techniques described herein. The output of the one or more machine learning models may be presented in a user interface displayed on the surface computing device 118.

Further, the training of the machine learning models may be initially performed used the gathered corpus of data and classified data, and then continuously or continually performed based on input received from user interfaces presented on the surface computing device 118. As such, the trained machine learning models 132 may be improved to provide better decoding results than conventional techniques of decoding signals received from MWD tools 109. In some embodiments, the training and updating of the machine learning models 132 may be performed at the surface computing device 118 and/or the cloud-based computing system 116. As described herein, the machine learning models 132 may be any suitable type of classifier and/or neural network (e.g., support vector machine, long-short term memory (LSTM), etc.).

FIG. 7 illustrates a method 700 of using a user interface to receive input pertaining to a previously received mud pulse signal and update a trained machine learning model to classify subsequently received mud pulse signals similarly to the input, according to embodiments of the disclosure. Method 700 includes operations performed by processors of a computing device (e.g., any component of FIG. 1, such as server 128 executing the artificial intelligence engine 140, the surface computing device 118, or the like). In some embodiments, one or more operations of the method 700 are implemented in computer instructions that are stored on a memory device and executed by a processing device. The method 700 may be performed in the same or a similar manner as described above in regards to method 600. The operations of the method 700 may be performed in some combination with any of the operations of any of the methods described herein.

At 702, the processing device may receive a mud pulse signal from a MWD tool. The MWD tool may include data (e.g., pressure measurement data).

At 704, the processing device may decode, using a trained machine learning model 132, the data to determine a value of the data. The machine learning model 132 may be trained using a dataset including inputs including a set of signals representing mud pulse signals and target outputs including a set of values representing data of the set of signals. The machine learning model 132 may be trained to decode the data based on training data including a set of slots, wherein each slot of the set of slots represents a value when a respective mud pulse signal is detected in the slot.

In some embodiments, the decoding may further include using a set of trained machine learning models 132 to decode the data to determine a set of values of the data. The value of the data may be determined based on one or more criteria associated with the plurality of values of the data. The one or more criteria may include (i) a majority of the plurality of values that match, (ii) a weighted sum, (iii) a non-linear evaluation function, (iv) a low-pass filter, (v) a determination of how close the value is to a prior value, (vi) a fuzzy logic selection, or some combination thereof.

In some embodiments, a majority of the plurality of values may match, but the processing device may select the next closest majority of values that match. For example, 300 machine learning models may be used to decode the value of the mud pulse signal. Of those 300, 200 machine learning models may output one value (e.g., 90), 75 machine learning models may output another value (e.g., 92), and 25 machine learning models may output yet another value (e.g., 96). In some embodiments, the value 92 may be selected as the correct value because it is associated with the second most machine learning models that agreed on that value.

At 706, the processing device may provide a user interface including the value of the data for presentation on a computing device (e.g., surface computing device 118) of a user. In some embodiments, the user interface may present the value of the data in a first graphical element and concurrently present a second graphical element capable of enabling confirmation of whether the value is valid or invalid.

At 708, the processing device may receive, from the computing device, a message classifying the value as valid or invalid. The message may be transmitted from the computing device in response to the second graphical element being utilized in the user interface presented on the surface computing device 118.

In some embodiments, the user interface may include another graphical element that enables repositioning at least a portion of the mud pulse signal into a slot that causes the value of the data to be modified. In some embodiments, this graphical element may include an overlaid template that is generated based on a user selecting a button to modify a value of the mud pulse signal. The overlaid template may be used to drag pulse pole from one slot to another slot and may be saved as updated data. The updated data may be transmitted to the trained machine learning model 132 such that the trained machine learning model 132 may be updated to classify subsequent mud pulse signals similar to the previously received mud pulse signal as having the value in the updated data.

At 710, the processing device may update, based on the message, the trained machine learning model 132 to classify the data in the mud pulse signal as representing the value, such that the trained machine learning model 132 decodes, based on the message, a subsequent mud pulse signal that is similar to the previously received mud pulse signal.

FIG. 8 illustrates a method of using a user interface to enable identifying a correct synchronization signal in a mud pulse signal and update a trained machine learning model based on the correct synchronization signal, according to embodiments of the disclosure. Method 800 includes operations performed by processors of a computing device (e.g., any component of FIG. 1, such as server 128 executing the artificial intelligence engine 140, the surface computing device 118, or the like). In some embodiments, one or more operations of the method 800 are implemented in computer instructions that are stored on a memory device and executed by a processing device. The method 800 may be performed in the same or a similar manner as described above in regards to method 600. The operations of the method 800 may be performed in some combination with any of the operations of any of the methods described herein.

At 802, the processing device may provide a user interface for presentation on the computing device (e.g., surface computing device 118) of a user. The user interface may present a graphical element for identifying where a synchronization signal is located in the mud pulse signal. In some embodiments, this graphical element may include an overlaid template that is generated based on a user selecting a button to correct a location of a synchronization signal in the mud pulse signal. The overlaid template may be used to identify the location of the synchronization signal and may be saved as updated data and included in a message.

At 804, the processing device may receive, from the computing device, the message identifying where the synchronization signal is located in the mud pulse signal.

At 806, the processing device may update, using the message, the trained machine learning model 132 to classify the data in the mud pulse signal by identifying the synchronization signal, such that the trained machine learning model 132 identifies subsequent synchronization signals in subsequent mud pulse signals based on where the synchronization signal is located in the previously received mud pulse signal (as specified in the updated data in the message).

Figure 9:
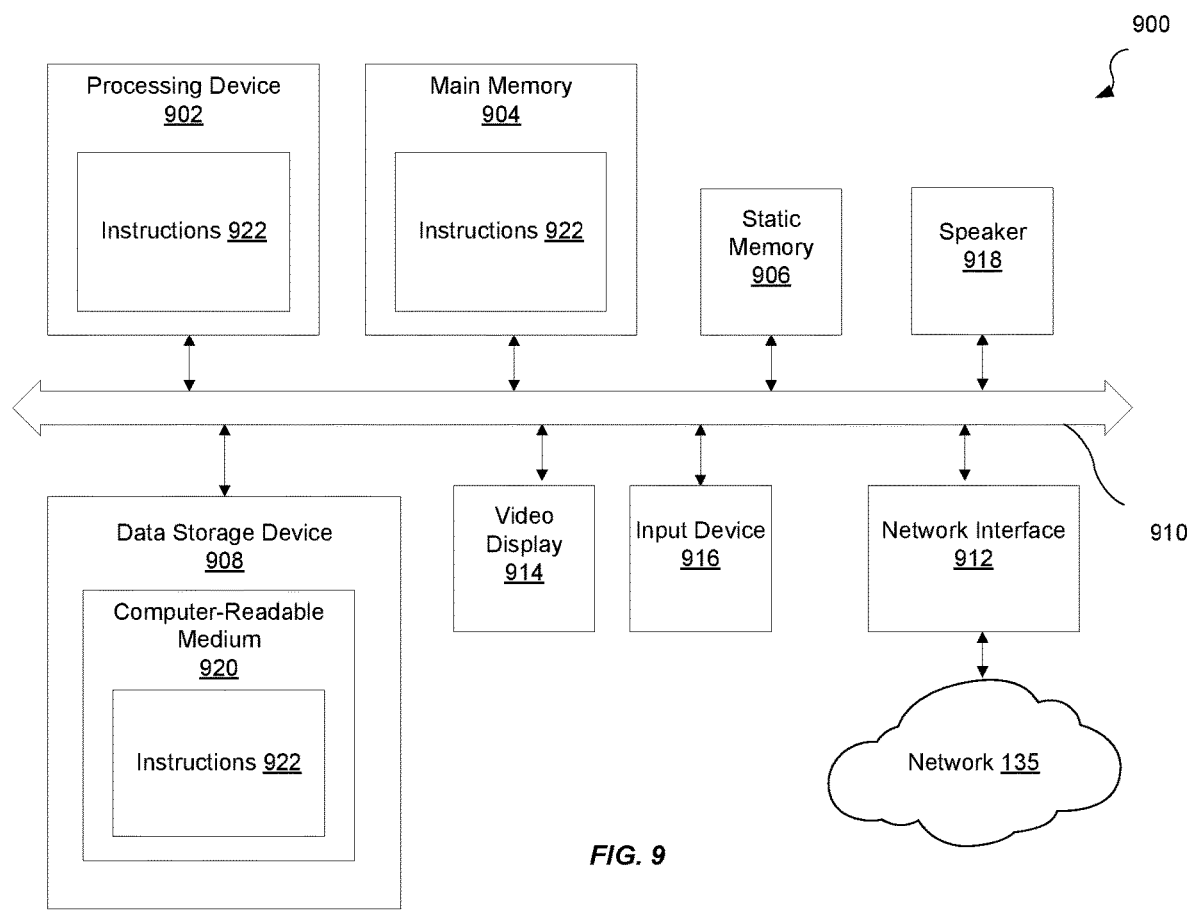
FIG. 9 illustrates an example computer system according to the present disclosure.

FIG. 9 shows an example computer system 900 which can perform any one or more of the methods described herein, in accordance with one or more aspects of the present disclosure. In one example, computer system 900 may correspond to the surface computing device 118 (e.g., user computing device), one or more servers 128 of the cloud-based computing system 116, the training engine 130, the MWD data acquisition system 100, the MWD tool 109, or any suitable component of FIG. 1. The computer system 900 may be capable of executing an application that presents any of the user interfaces described herein, training the one or more machine learning models 132, and/or executing the one or more machine learning models 132 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a wearable (e.g., wristband), a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 900 includes a processing device 902, a main memory 904 (e.g., read-only memory (ROM), flash memory, solid state drives (SSDs), dynamic random access memory (DRAM) such as synchronous DRAM (SDRAM)), a static memory 906 (e.g., flash memory, solid state drives (SSDs), static random access memory (SRAM)), and a data storage device 908, which communicate with each other via a bus 910.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a system on a chip, a field programmable gate array (FPGA), a digital signal processor (DSP), network processor, or the like. The processing device 902 is configured to execute instructions for performing any of the operations and steps discussed herein.

The computer system 900 may further include a network interface device 912. The computer system 900 also may include a video display 914 (e.g., a liquid crystal display (LCD), a light-emitting diode (LED), an organic light-emitting diode (OLED), a quantum LED, a cathode ray tube (CRT), a shadow mask CRT, an aperture grille CRT, a monochrome CRT), one or more input devices 916 (e.g., a keyboard and/or a mouse), and one or more speakers 918 (e.g., a speaker). In one illustrative example, the video display 914 and the input device(s) 916 may be combined into a single component or device (e.g., an LCD touch screen).

The data storage device 916 may include a computer-readable medium 920 on which the instructions 922 embodying any one or more of the methods, operations, or functions described herein is stored. The instructions 922 may also reside, completely or at least partially, within the main memory 904 and/or within the processing device 902 during execution thereof by the computer system 900. As such, the main memory 904 and the processing device 902 also constitute computer-readable media. The instructions 922 may further be transmitted or received over a network 135 via the network interface device 912.

While the computer-readable storage medium 920 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Figure 10:
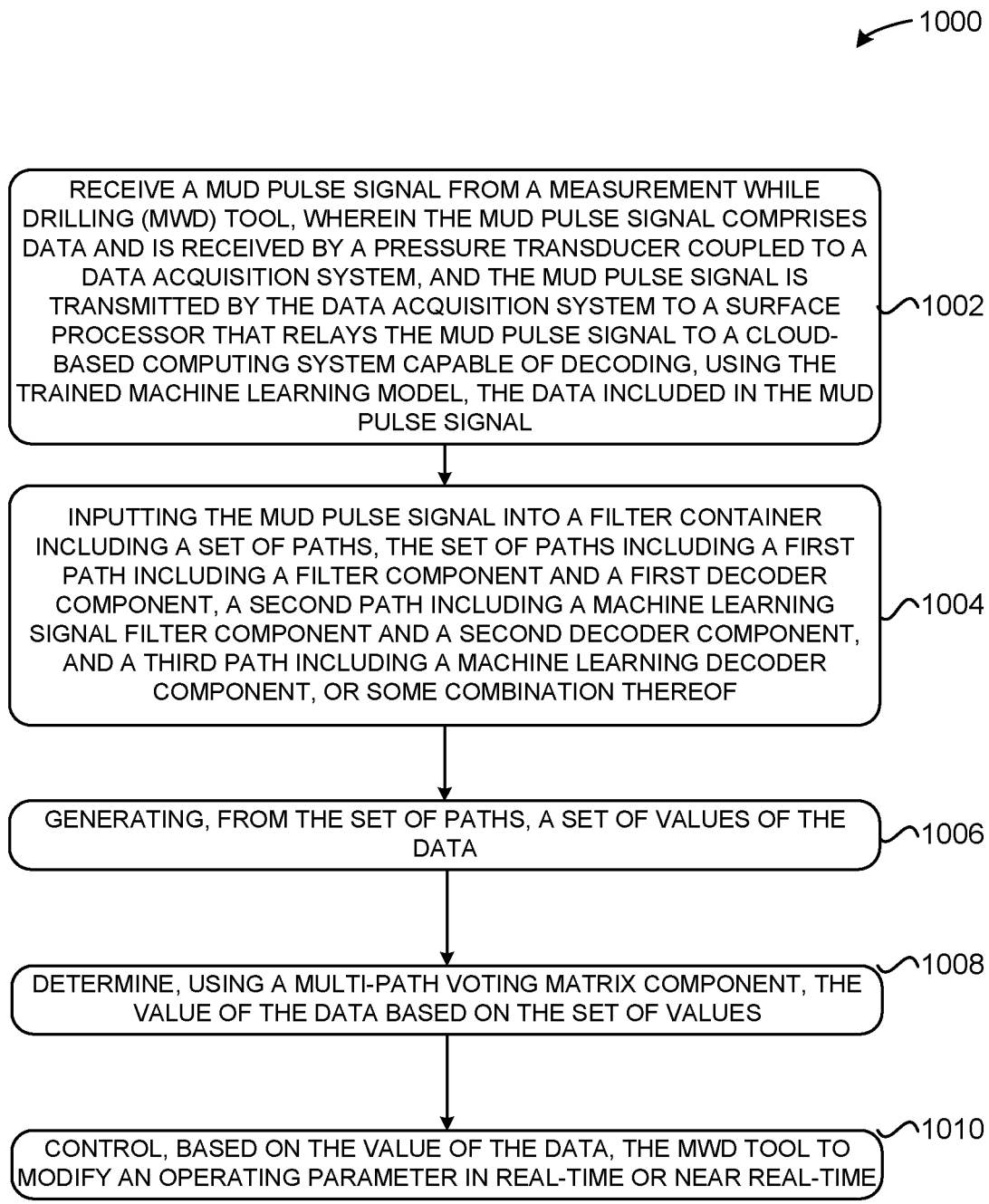
FIG. 10 illustrates a method of using a multi-path voting matrix component to determine a value of data based on a set of values from a set of paths according to the present disclosure.

FIG. 10 illustrates a method 1000 of using a multi-path voting matrix component to determine a value of data based on a set of values from a set of paths according to the present disclosure. Method 1000 includes operations performed by processors of one or more computing devices (e.g., any component of FIG. 1, such as cloud-based computing system 116 including server 128 executing the artificial intelligence engine 140, the surface computing device 118, data acquisition system 100, or the like). In some embodiments, one or more operations of the method 1000 are implemented in computer instructions that are stored on one or more memory devices and executed by one or more processing devices. The method 1000 may be performed in the same or a similar manner as described above in regards to method 600. The operations of the method 1000 may be performed in some combination with any of the operations of any of the methods described herein.

At 1002, the processing device may receive a mud pulse signal from a measurement while drilling (MWD) tool 109. The mud pulse signal may include data and may be received by a pressure transducer communicatively coupled to a data acquisition system 100. The mud pulse signal may be transmitted by the data acquisition system 100 to a surface processor 118 that relays the mud pulse signal to a cloud-based computing system 116 capable of decoding, using one or more trained machine learning models 132, the data included in the mud pulse signal. The one or more trained machine learning models 132 may perform one or more operations pertaining to filtering the mud pulse signal and/or decoding the mud pulse signal.

In some embodiments, prior to transmitting (e.g., relaying) the mud pulse signal to the cloud-based computing system 116, the surface processor 118 may determine whether one or more characteristics (e.g., latency, data throughput, packet loss, bandwidth, etc.) of a network 135 satisfy one or more thresholds. In some embodiments, responsive to determining the one or more characteristics of the network 135 satisfy the one or more thresholds, the surface processor 118 may transmit the mud pulse signal to the cloud-based computing system 116. In some embodiments, responsive to determining the one or more characteristics of the network 135 do not satisfy the one or more thresholds, the surface processor 118 may downsample, compress, or both, the mud pulse signal to generate a modified mud pulse signal and may transmit the modified mud pulse signal to the cloud-based computing system 116.

In some embodiments, prior to transmitting (e.g., relaying) the mud pulse signal to the cloud-based computing system 116, the surface processor 118 may determine whether the cloud-based computing system 116 is available. The surface processor 118 may determine whether the cloud-based computing system 116 is available by pinging or transmitting a message to the cloud-based computing system 116 and determining whether a response (e.g., an acknowledgement (ACK) message)) is received from the cloud-based computing system 116. In some embodiments, the surface processor 118 may determine an elapsed time it takes for the cloud-based computing system 116 to transmit a response after receiving the message. If the elapse time is greater than a threshold amount of time, the surface processor 118 may determine the cloud-based computing system 116 is unavailable for decoding.

In some embodiments, the processing device may decode, using the trained machine learning model 132, the data to determine the value of the data. Decoding may include the processing device inputting (1004) the mud pulse signal into a filter container including a set of paths. The set of paths may include a first path including a filter component and a first decoder component, a second path including a machine learning signal filter component and a second decoder component, and a third path including a machine learning decoder component, or some combination thereof.

In some embodiments, the decoder component receives the mud pulse signal as a filtered continuous input signal and identifies a highest peak of the filtered continuous input signal within a packet window to determine the value of the data. In some embodiments, the highest peak may be associated with a value of the data.

In some embodiments, the machine learning signal filter component receives the mud pulse signal as an unfiltered continuous input signal and outputs the filtered continuous signal. The machine learning signal filter component may include a machine learning model 132 trained to filter out noise, cancel echoes, and/or output the filtered continuous signal. The machine learning model 132 may be trained with a corpus of training data including labeled mud pulse signals where the labels identify various signatures (e.g., synchronization, noise, etc.) mapped to output filtered signals.

In some embodiments, the machine learning decoder component receives the mud pulse signal as the unfiltered continuous input signal, filters the unfiltered continuous input signal, and outputs a decoded bitstream representing the value of the data. The machine learning decoder component may include a machine learning model 132 trained to filter unfiltered continuous signals and to decode the filtered continuous signal. The machine learning model 132 may be trained to identify a highest peak within a packet window similar to the decoder component and output a value associated with the highest peak. The value may be accepted or rejected by a user as accurate or inaccurate, and the confirmation may be used to retrain the machine learning model 132 to select features that choose more optimal (e.g., accurate) values.

At 1006, the processing device may generate, from the set of paths, a set of values of the data. For example, each path may generate a respective value. Any suitable number of values may be generated by any suitable number of paths. In some embodiments, a path may generate one or more values. Further, each path may generate and assign a confidence level to the value generated. The confidence level may be assigned based on historical data indicating whether the values generated by the paths have been accurate or inaccurate in the past, a degree of variance from the output values and actual values of data in mud pulse signals, and the like.

At 1008, the processing device may determine, using a multi-path voting matrix component, the value of the data based on the set of values. In some embodiments, the processing device may determine the value of the data by identifying a set of confidence levels associated with the set of paths. Further, in some embodiments, the processing device may select the value of the data generated by one of the set of paths based on its respective confidence level. In some embodiments, the multi-path voting matrix component may use a second machine learning model 132 trained to determine, based on the set of confidence levels, the value of the data from the set of values. For example, the machine learning model 132 may select the value for a path that has the highest confidence level. In some embodiments, the machine learning model 132 may be trained to select a value from a path that does not have the highest confidence level for a single output, but on average over a period of time, has a highest confidence level.

At 1010, the processing device may control, based on the value of the data, the MWD tool 109 to modify an operating parameter in real-time (e.g., less than 2 seconds) or near real-time (e.g., between 2 and 10 seconds). For example, the processing device may transmit a message to the surface processor to cause the surface processor to control the MWD tool 109. The surface processor may use telemetry (e.g., mud pulse or electromagnetic) to communicate a control instruction to the MWD tool 109 to cause an operating parameter (e.g., data rate, pulse width, etc.) to be modified.

Figure 11:
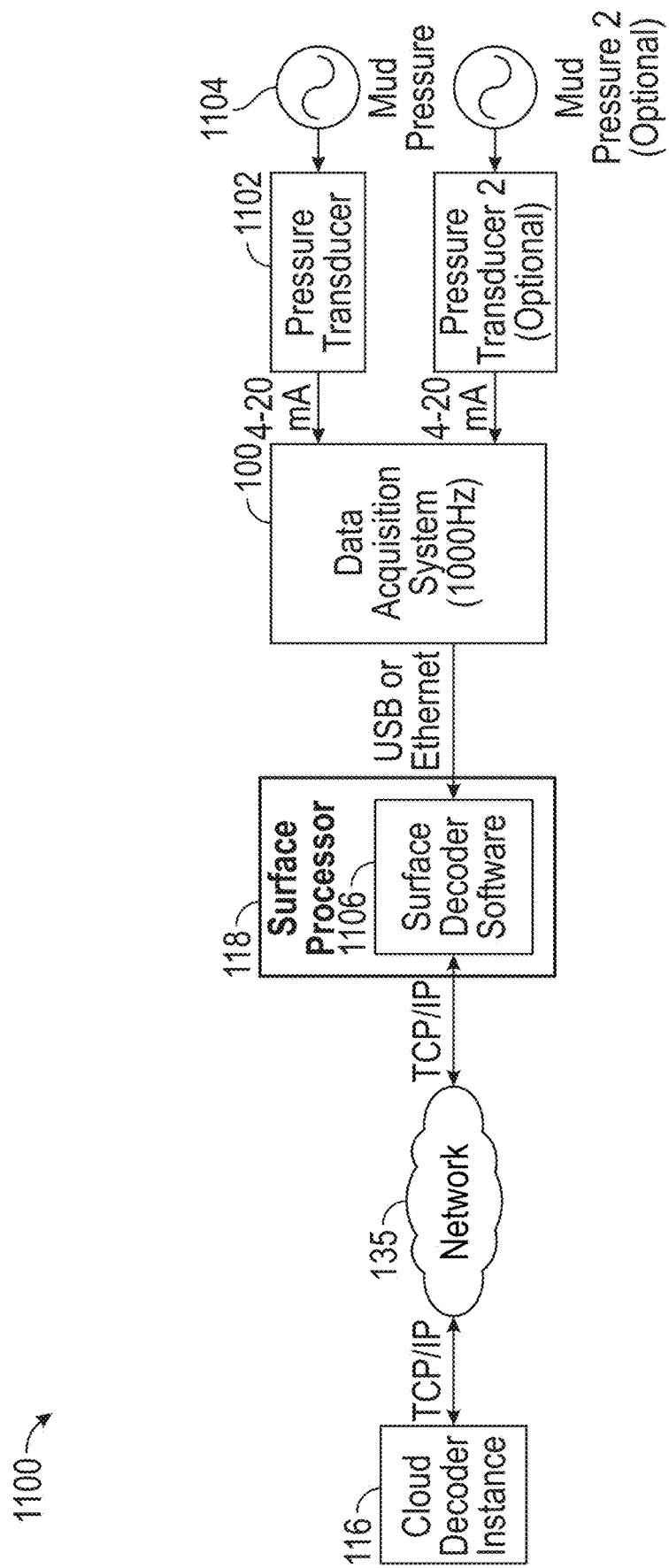
FIG. 11 illustrates an example component diagram of a system architecture for performing decoding using a cloud-based computing system according to the present disclosure.

FIG. 11 illustrates an example component diagram of a system architecture 1100 for performing decoding using a cloud-based computing system 116 according to the present disclosure. The term "cloud decoder instance" and "cloud-based computing system" may be used interchangeably herein.

In some embodiment, a mud pulse signal 1104 may be transmitted using mud pulse telemetry from the MWD tool 109 by regulating valves to cause pressure pulses that generate the mud pulse signal 1104. The pressure pulses may represent measurements obtained by one or more sensors of the MWD tool 109 and the measurements may be converted into an amplitude-modulated or frequency-modulated pattern of mud pulses. The mud pulse signal 1104 may be received by one or more pressure transducers 1102. The pressure transducer 1102 may convert pressure in the mud pulse signal 1104 into an analog electrical signal representing the mud pulse signal 1104. The analog electrical signal may encode one or more values in data measured by one or more sensors of the MWD tool 109. The pressure transducers may use one or more strain gauges to measure the force (pressure) acting on them.

The pressure transducer 1102 may be communicatively coupled to the data acquisition system 100, and the pressure transducer 100 may transmit the mud pulse signal 1104 to the data acquisition system 100. For example, a 4-20 MilliAmp (mA) direct current loop may be used to transmit an analog mud pulse signal to the data acquisition system 100. The 4-20 mA may include a point-to-point or multi-drop circuit to transmit the analog signal from 4 to 20 mA that represents 0 to 100 percent of a process variable. The data acquisition system may be communicatively coupled to the surface processor 118. For example, the cable may be communicatively and/or electrically connected to both the surface processor 118 and he data acquisition system 100. The cable 118 may enable transmitting data via a universal serial bus (USB) protocol, an Ethernet protocol, or any suitable cable and communication standards described herein. The data acquisition system 100 may include an analog to digital converter (ADC) that converts the analog mud pulse signal to a digital mud pulse signal. The data acquisition system 100 may transmit the digital mud pulse signal to the surface processor 118.

The surface processor 118 may execute surface decoder software 1106 that are implemented in computer instructions and stored in one or more memory devices. The surface decoder software 1106 may be executed to perform various operations, such as determining whether the cloud decoder instance 116 is available, determining whether one or more characteristics of the network 135 satisfy one or more thresholds, transmitting (e.g., relaying) the digital mud pulse signal to the cloud decoder instance 116, and the like.

As depicted, the cloud decoder instance 116 is communicatively coupled to the surface processor 118 via the network 135. In some embodiments, the network 135 may include a wide area network (e.g., the Internet) and may use a transmission protocol such as TCP/IP to communicate messages/data between the cloud decoder instance 116 and the surface processor 118. The surface decoder software 1106 may be executed by the surface processor 118 to transmit the mud pulse signal to the cloud decoder instance via the network 135.

Further, the cloud decoder instance 116 may transmit a decoded value of the data included in a mud pulse signal to the surface processor 118. The surface decoder software 1106 may be executed to present the decoded value in a user interface (e.g., in a graph, chart, any suitable graphical element, etc.), to perform a control action (e.g., adjust the pulse width of signals sent from the MWD tool 109, adjust the data rate of transmissions of the MWD tool 109, etc.), etc. For example, the surface processor 118 executing the surface decoder software 1106 may receive the decoded value of the pressure and determine that it is above a threshold. As a result, the surface processor 118 executing the surface decoder software 1106 may transmit a downlink message (e.g., via mud pulse telemetry) to the MWD tool 1009 to adjust an operating parameter (e.g., a data rate, a pulse width, etc.).

Figure 12:
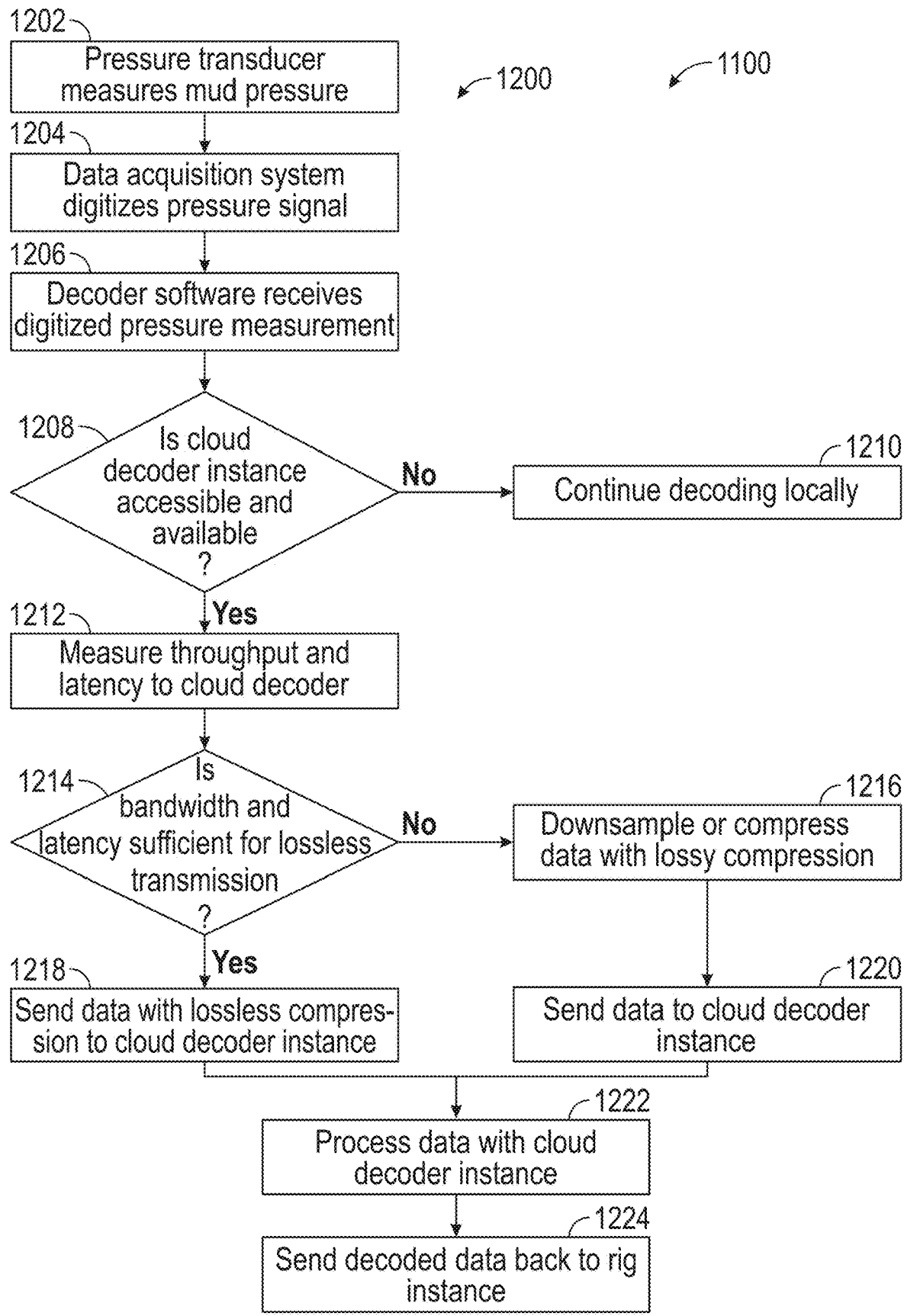
FIG. 12 illustrates a method of using a cloud-based computing system to perform decoding after various conditions are satisfies according to the present disclosure.

FIG. 12 illustrates a method 1200 of using a cloud-based computing system 116 to perform decoding after various conditions are satisfies according to the present disclosure. Method 1200 includes operations performed by processors of one or more computing devices (e.g., any component of FIG. 1, such as server 128 executing the artificial intelligence engine 140, the surface computing device 118, data acquisition system 100, or the like). In some embodiments, one or more operations of the method 1200 are implemented in computer instructions that are stored on one or more memory devices and executed by one or more processing devices. The method 1200 may be performed in the same or a similar manner as described above in regards to method 600. The operations of the method 1200 may be performed in some combination with any of the operations of any of the methods described herein.

At 1202, a pressure transducer may measure mud pressure from a mud pulse signal sent from the MWD tool 109. The pressure transducer may transmit an analog mud pulse signal encoding data representing the pressure to a data acquisition system 100. At 1204, the data acquisition system 100 may digitize the analog mud pulse signal encoding a pressure value. The data acquisition system 100 may transmit the digital mud pulse signal to the surface processor 118. At 1206, the surface decoder software 1106 may receive the digital mud pulse signal (e.g., digitized pressure measurement).

At 1208, the surface processor 118 executing the surface decoder software 1106 may determine whether the cloud decoder instance 116 is accessible and available. In some embodiments, to determine whether the cloud decoder instance 116 is accessible and available, the surface processor 118 may transmit one or more messages to the cloud decoder instance 116 via the network 135 and determine whether one or more responses are received from the cloud decoder instance 116, or received in a timely manner from the cloud decoder instance 116 (e.g., within a certain time period or before a certain amount of time elapses).

If the cloud decoder instance 116 is determined to not be accessible and/or available, then the surface processor 118 executing the surface decoder software 1106 may decode the digital mud pulse signal locally at the surface processor 118 without sending the digital mud pulse signal to the cloud decoder instance 116. The surface decoder software 1106 may use various decoding techniques, such as M-ary decoding, to decode the digital mud pulse signal to determine a value of data included in the digital mud pulse signal. M-ary refers to a type of Pulse Position Modulation (PPM) encoding scheme. In some embodiments, any decoding scheme applicable to PPM may be used by the surface decoder software 1106. The surface decoder software 1106 may receive a filtered continuous signal, and based off of the timing determined from a synchronization signal, may identify where the various packet boundaries fall. The surface decoder software 1106 may determine where the highest peak is located within each packet and the highest peak's position within the packet to determine the value encoded by that given packet.

If the cloud decoder instance 116 is determine to be accessible and/or available, then at 1212, the surface processor 118 may measure throughput and latency of the network 135 to the cloud decoder instance 116. The surface processor 118 may measure throughput (e.g., bandwidth) by transmitting a burst of data packets within a time window and determining how many data packets successfully arrive at target addresses (e.g., the cloud decoder instance 116). Throughput may measure the speed at which data traffic passes over the network 135 and may be reported in data units per second. The latency of the network 135 may be a measurement of delay. For example, latency may measure the time it takes for some data to get to its destination across the network 135.

The surface processor 118 may determine whether the latency and/or bandwidth satisfy one or more threshold levels to perform lossless transmission. If the bandwidth and/or latency do not satisfy the one or more threshold levels to perform lossless transmission, the surface processor 118 may downsample or compress the data with lossy compression. Downsampling may refer to the process of reducing the sampling rate of a signal (e.g., by an integer factor by picking up one of out N samples). Compressing data with lossy compression may refer to a process of data compression in which the size of a file including data may be reduced by eliminating data in the file. Lossy compression may use inexact approximations and/or partial data discarding to represent the content of the mud pulse signal to reduce the size of data for transmission. The surface processor 118 may transmit the data to the cloud decoder instance 116 at 1220. At 1222, the cloud decoder instance 116 may process the data to decode the data and determine a value. In some embodiments, one or more machine learning models 132 may be used to decode the data, as described further herein. At 1224, the cloud decoder instance 116 may transmit the decoded value back to the surface processor 118 to be presented and/or to be processed (e.g., used to perform a control action).

If the bandwidth and/or latency satisfy the one or more threshold levels to preform lossless transmission, the surface processor 118 may transmit the data after performing lossless compression to the cloud decoder instance 116. Lossless compression may refer to a class of data compression algorithms that enables original data to be reconstructed from compressed data. Lossless compression may not eliminate data when compressing the data. At 1222, the cloud decoder instance 116 may process the data to decode the data and determine a value. In some embodiments, one or more machine learning models 132 may be used to decode the data, as described further herein. At 1224, the cloud decoder instance 116 may transmit the decoded value back to the surface processor 118 to be presented and/or to be processed (e.g., used to perform a control action).

Figure 13:
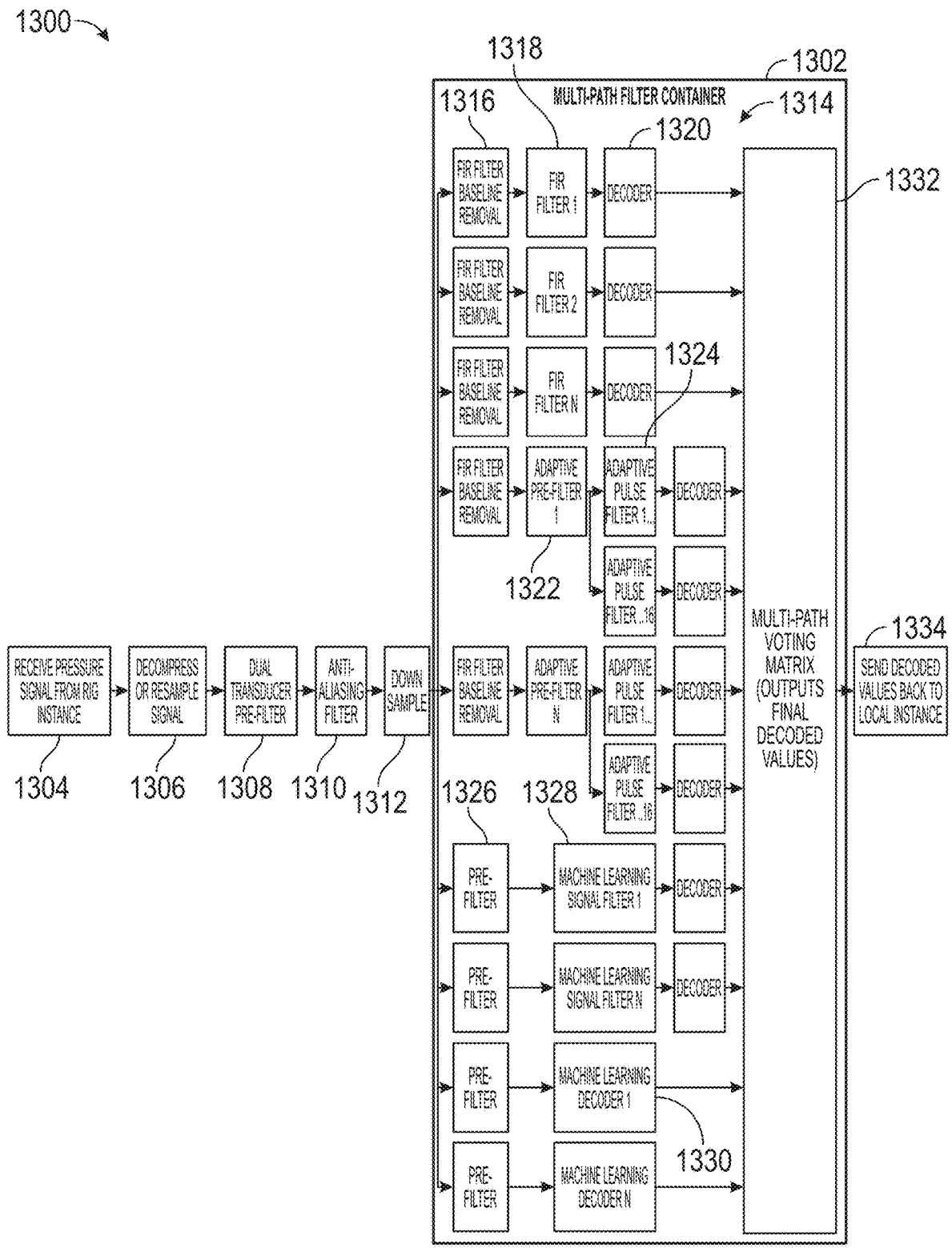
FIG. 13 illustrates an example component diagram of using a multi-path filter container to perform decoding according to the present disclosure.

FIG. 13 illustrates an example component diagram 1300 of using a multi-path filter container 1302 to perform decoding according to the present disclosure. At 1304, the cloud-based computing system 116 (e.g., server 128) may receive a pressure signal (e.g., digital mud pulse signal) from the surface processor 118 via the network 135. At 1306, the cloud-based computing system 116 may decompress and/or resample the mud pulse signal based on whether the surface processor 118 compressed and/or downsampled the mud pulse signal prior to transmitting it to the cloud-based computing system 116.

In some embodiments, prior to transmitting the mud pulse signal to the multi-path filter container 1302, a processing device of the cloud-based computing system 116 may execute a dual transducer pre-filter 1308 and/or an anti-aliasing filter 1310. The dual transducer pre-filter 1308 may perform noise cancellation by performing operations to determine whether a portion of a signal is received from uphole first or from downhole first. The anti-aliasing filter 1310 may include a low pass filter that cuts off high frequency noise that may affect the sampling rate of the signal. Further, the processing device may downsample 1312 the mud pulse signal (e.g., by removing a certain number of samples).

The multi-path filter container 1302 may include a set of paths 1314. Each path 1314 may include one or more components that are configured to perform one or more operations. Each path 1314 may receive the mud pulse signal as input and output a decoded value to the multipath voting matrix component 1332. Each path may generate a confidence level to associate with the decoded value. The confidence level may be determined by the path based on a history of correct decoded values determined by the path, one or more weights applied to the path, a standard deviation of error from the decoded value determined by the path and the actual value, or the like.

In some embodiments, a first path may include a finite impulse response (FIR) filter baseline removal component 1316, a FIR filter component 318, and a decoder component 1320. The FIR filter baseline removal component 1316 may remove the baseline pump pressure from the mud pulse signal. For example, the pump pressure may be 5000 psi and on top of that ride the mud pulse signal so the pump pressure baseline may be removed from the signal. The FIR filter component 1316 may be a linear filter that removes noise from a mud pulse signal including the noise based on an ideal mud pulse signal. There may be numerous instances of the first path in the multi-path filter container 1302. The number of instances may be determined based on a number of factors including an amount of processing resources available at the cloud-based computing system 116, an amount of memory resources available at the cloud-based computing system 116, a priority of determining the value of the data, or the like.

In some embodiments, a second path may include the FIR filter baseline removal component 1316, an adaptive pre-filter component 1322, an adaptive pulse filter component 1324, and the decoder component 1320. Adaptive filters may be configured to adapt a received mud pulse synchronization signal including noise (e.g., noise signature) to an ideal mud pulse synchronization signal. The adaptive filters may be tuned to remove certain noise signatures that are present in received mud pulse signals. The adaptive pre-filter component 1322 may be configured with an ideal synchronization signal (e.g., four spaced pulses (e.g., half sine waves equally spaced)), and receives the mud pulse signal to compare with the ideal signal. The adaptive pre-filter component 1322 may perform one time training on the synchronization pulse each time the pump is turned on and off. There may be numerous instances of the second path in the multi-path filter container 1302. The number of instances may be determined based on a number of factors including an amount of processing resources available at the cloud-based computing system 116, an amount of memory resources available at the cloud-based computing system 116, a priority of determining the value of the data, or the like.

In some embodiments, a third path may include a pre-filter component 1326, a machine learning signal filter component 1328, and the decoder component 1320. There may be numerous instances of the third path in the multi-path filter container 1302. The number of instances may be determined based on a number of factors including an amount of processing resources available at the cloud-based computing system 116, an amount of memory resources available at the cloud-based computing system 116, a priority of determining the value of the data, or the like.

In some embodiments, a fourth path may include the pre-filter component 1326 and a machine learning decoder component 1330. There may be numerous instances of the fourth path in the multi-path filter container 1302. The number of instances may be determined based on a number of factors including an amount of processing resources available at the cloud-based computing system 116, an amount of memory resources available at the cloud-based computing system 116, a priority of determining the value of the data, or the like.

In some embodiments, the decoder component 1320 may receive the mud pulse signal as a filtered continuous input signal and identifies a highest peak of the filtered continuous input signal within a packet window to determine the value of the data. For example, the decoder component 1320 may perform thresholding and convert a filtered continuous input signal to binary data. Thresholding may refer to determining relative time between peaks to determine which peak represents a value of the data, and/or relative height of the peaks to determine whether the peak represents a value or is noise.

In some embodiments, the machine learning signal filter component 1328 may receive the mud pulse signal as an unfiltered continuous input signal and may output the filtered continuous signal. The machine learning signal filter component 1328 may be trained to receive the analog mud pulse signal and perform filtering on it such as echo cancellation, noise removal, etc. (e.g., the machine learning signal filter component 1328 may be trained using a corpus of training data that includes labeled or tag input analog or digital mud pulse signals mapped to output filtered mud pulse signals).

In some embodiments, the machine learning decoder component 1330 may receive the mud pulse signal as the unfiltered continuous input signal, may filter the unfiltered continuous input signal, and may output a decoded bitstream representing the value of the data (e.g., the machine learning decoder may be trained using a corpus of training data including labeled or tagged unfiltered continuous input signals (e.g., digital or analog) that is filtered and then mapped to determined values represented by the bitstream as output, where the determined value is associated with a peak in the filtered signal). In some embodiments, the machine learning decoder component 1330 may be trained to perform one or more operations described with regard to the decoder component 1320. In some embodiments, the machine learning decoder component 1330 may be trained with training data to perform peak optimization techniques to identify one or more peaks in a filtered mud pulse signal. Further, the machine learning decoder component 1330 may be trained to determine one or more lengths of time between the peaks in the mud pulse signal to determine which peak represents a value in a particular time frame. The machine learning decoder component 1330 may be trained to convert the mud pulse signal to binary data representing the value(s) included in the mud pulse signal.

In some embodiments, the multi-path voting matrix component 1332 may receive the set of values from the set of paths. The multi-path voting matrix component 1332 may determine a value of the data included in the mud pulse signal based on the set of values received from the set of paths. For example, the multi-path voting matrix component 1332 may identify a set of confidence levels associated with the set of paths, and may select the value of the data generated by one of the set of paths based on its respective confidence level. At 1334, the cloud-based computing system 116 may transmit the decoded value(s) to the surface processor 118 for presentation and/or further processing. For example, in some embodiments, the decoded value(s) may be used to perform a control action, such as changing an operating parameter (e.g., data rate, pulse width, etc.) of the MWD tool 109.

Figure 14:
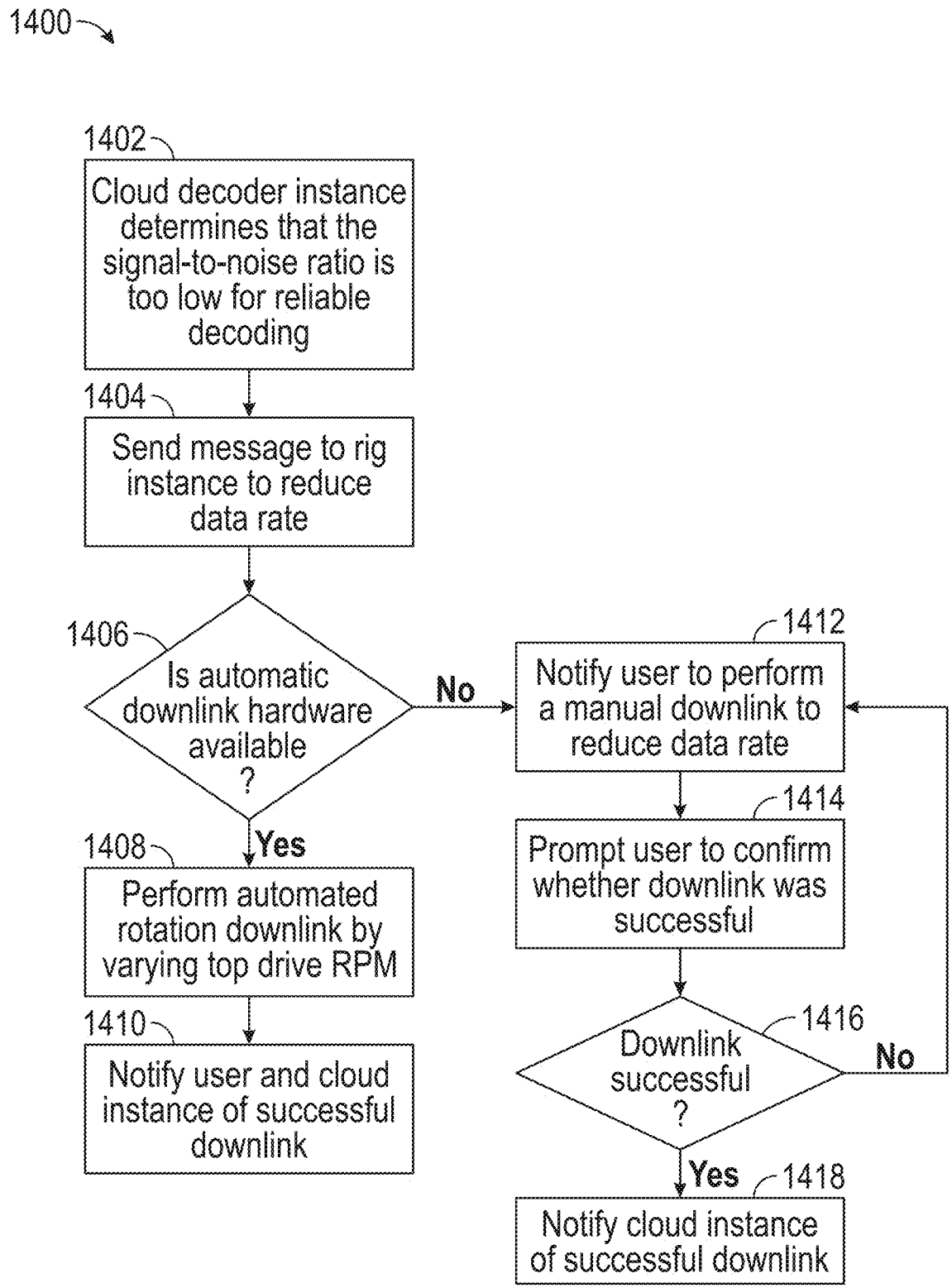
FIG. 14 illustrates a method of performing a control action based on a characteristic of a mud pulse signal according to the present disclosure.

FIG. 14 illustrates a method 1400 of performing a control action based on a characteristic of a mud pulse signal according to the present disclosure. Method 1400 includes operations performed by processors of one or more computing devices (e.g., any component of FIG. 1, such as server 128 executing the artificial intelligence engine 140, the surface computing device 118, data acquisition system 100, or the like). In some embodiments, one or more operations of the method 1400 are implemented in computer instructions that are stored on one or more memory devices and executed by one or more processing devices. The method 1400 may be performed in the same or a similar manner as described above in regards to method 600. The operations of the method 1400 may be performed in some combination with any of the operations of any of the methods described herein.

At 1402, the cloud decoder instance 116 may determine that the signal-to-noise ratio of a received mud pulse signal is below a threshold level to perform reliable decoding. At 1404, the cloud decoder instance 116 may transmit a message to the surface processor 118 to reduce the data rate at which it obtains measurements from the MWD tool 109.

At 1406, the surface processor 118 may receive the message and determine whether automatic downlink hardware is available. In some embodiments, if the MWD tool 109 supports electromagnetic downlink, the downlink hardware may include a downlink box (e.g., computing device) connected to two electrodes that generate a high power electromagnetic signal that is detected by the MWD tool 109. If the MWD tool 109 uses mud pulse telemetry, the surface decoder software 1106 may transmit one or more commands to the rig control system (e.g., downlink hardware) to change pump states (e.g., turn them on/off in a predetermined pattern) or to change the rotary speed (e.g., vary the revolutions per minute up/down in a predetermined pattern).

If the downlink hardware is available, then at 1408, the surface processor 118 may perform automated rotation downlink by varying top drive revolutions per minute. At 1410, the surface processor 118 may notify a user (e.g., via a notification on a display screen of the surface processor 118 and/or via a message to a computing device (smartphone) of the user) and/or the cloud decoder instance 116 of the successful downlink message. Success fully transmitting the downlink message (e.g., via mud pulse telemetry and/or electromagnetic telemetry) may cause an operating parameter of the MWD tool 109 to be modified. For example, the modification may include changing a data rate at which measurements are transmitted from the MWD tool 109.

It should be noted that a certain decoded value from the cloud decoder instance 116 may cause the surface processor 118 to transmit a downlink message. For example, if the decoded value of a measurement is above, below, or equal to a certain threshold, then the surface processor 118 may transmit a downlink message to the MWD tool 109 to modify an operating parameter.

If the downlink hardware is not available, then at 1412, the surface processor may notify a user to perform a manual downlink to reduce the data rate. At 1414, the surface processor 118 may prompt the user to confirm whether the downlink was successful. At 1416, the surface processor 118 may determine whether the downlink was successful based on information received from the user. If the downlink was not successful, the method 1400 may return to 1412. If the downlink was successful, the method 1400 may continue to 1418 where the surface processor 118 may notify the cloud decoder instance 116 of a successful downlink.

Consistent with the above disclosure, the examples of systems and method enumerated in the following clauses are specifically contemplated and are intended as a non-limiting set of examples.

Clause 1. A method for using a trained machine learning model to classify mud pulse signals, the method comprising:
receiving a mud pulse signal from a measurement while drilling (MWD) tool, wherein the mud pulse signal comprises data;
decoding, using the trained machine learning model, the data to determine a value of the data; and
providing a user interface comprising the value of the data for presentation on a computing device of a user.

Clause 2. The method of any preceding clause, wherein the user interface presents the value of the data in a first graphical element and concurrently presents a second graphical element capable of enabling confirmation of whether the value is valid or invalid.

Clause 3. The method of any preceding clause, further comprising:
receiving, from the computing device, a message classifying the value as valid or invalid, wherein the message is transmitted from the computing device in response to the second graphical element being utilized; and
updating, based on the message, the trained machine learning model to classify the data in the mud pulse signal as representing the value, such that the trained machine learning model decodes, based on the message, a subsequent mud pulse signal that is similar to the mud pulse signal.

Clause 4. The method of any preceding clause, wherein the trained machine learning model is trained using a dataset comprising inputs including a plurality of signals representing mud pulse signals and target outputs including a plurality of values representing data of the plurality of signals.

Clause 5. The method of any preceding clause, further comprising;
providing a second user interface for presentation on the computing device of the user, wherein the second user interface presents a graphical element for identifying where a synchronization signal is located in the mud pulse signal;
receiving, from the computing device, a message identifying where the synchronization signal is located in the mud pulse signal; and
updating, using the message, the trained machine learning model to classify the data in the mud pulse signal by identifying the synchronization signal, such that the trained machine learning model identifies subsequent synchronization signals in subsequent mud pulse signals based on where the synchronization signal is located in the mud pulse signal.

Clause 6. The method of any preceding clause, wherein the trained machine learning model is trained to decode the data based on training data comprising a plurality of slots, wherein each slot of the plurality of slots represents a value when a respective mud pulse signal is detected in the slot.

Clause 7. The method of any preceding clause, wherein the decoding further comprises:
  using a plurality of trained machine learning models to decode the data to determine a plurality of values of the data; and
  determining the value of the data based on one or more criteria associated with the plurality of values of the data, the one or more criteria comprising (i) a majority of the plurality of values that match, (ii) a weighted sum, (iii) a non-linear evaluation function, (iv) a low-pass filter, (v) a determination of how close the value is to a prior value, (vi) a fuzzy logic selection, or some combination thereof.

Clause 8. The method of any preceding clause, wherein the user interface comprises a graphical element that enables repositioning at least a portion of the mud pulse signal into a slot that causes the value of the data to be modified.

Clause 9. The method of any preceding clause, wherein the mud pulse signal is received by a pressure transducer coupled to a data acquisition system, and the mud pulse signal is transmitted by the data acquisition system to a surface processor that relays the mud pulse signal to a cloud-based computing system capable of decoding, using the trained machine learning model, the data included in the mud pulse signal.

Clause 10. The method of any preceding clause, wherein, prior to relaying the mud pulse signal to the cloud-based computing system, the surface processor determines whether one or more characteristics of a network satisfy one or more thresholds.

Clause 11. The method of any preceding clause, wherein, responsive to determining the one or more characteristics of the network satisfy the one or more thresholds, the surface processor transmits the mud pulse signal to the cloud-based computing system.

Clause 12. The method of any preceding clause, wherein, responsive to determining the one or more characteristics of the network do not satisfy the one or more thresholds, the surface processor downsamples, compresses, or both the mud pulse signal to generate a modified mud pulse signal and transmits the modified mud pulse signal to the cloud-based computing system.

Clause 13. The method of any preceding clause, wherein, prior to relaying the mud pulse signal to the cloud-based computing system, the surface processor determines whether the cloud-based computing system is available.

Clause 14. The method of any preceding clause, wherein decoding, using the trained machine learning model, the data to determine the value of the data comprises:
  inputting the mud pulse signal into a filter container comprising a plurality of paths, wherein the plurality of paths comprise:
    a first path including a filter component and a first decoder component,
    a second path including a machine learning signal filter component and a second decoder component,
    a third path including a machine learning decoder component, or
    some combination thereof.

Clause 15. The method of any preceding clause, further comprising:
  generating, from the plurality of paths, a plurality of values of the data; and
  determining, using a multi-path voting matrix component, the value of the data based on the plurality of values, wherein the determining comprises:
    identifying a plurality of confidence levels associated with the plurality of paths, and
    selecting the value of the data generated by one of the plurality of paths based on its respective confidence level.

Clause 16. The method of any preceding clause, wherein the multi-path voting matrix component uses a second machine learning model trained to determine, based on the plurality of confidence levels, the value of the data from the plurality of values.

Clause 17. The method of any preceding clause, wherein:
  the decoder component receives the mud pulse signal as a filtered continuous input signal and identifies a highest peak of the filtered continuous input signal within a packet window to determine the value of the data,
  the machine learning signal filter component receives the mud pulse signal as an unfiltered continuous input signal and outputs the filtered continuous signal, and
  the machine learning decoder component receives the mud pulse signal as the unfiltered continuous input signal, filters the unfiltered continuous input signal, and outputs a decoded bitstream representing the value of the data.

Clause 18. The method of any preceding clause, further comprising controlling, based on the value of the data, the MWD tool to modify an operating parameter in real-time or near real-time, wherein the operating parameter comprises a pulse width of transmitted telemetry signals, a data rate of the transmitted telemetry signals, or some combination thereof.

Clause 19. A tangible, non-transitory computer-readable medium storing instructions that, when executed, cause a processing device to:
  receive a mud pulse signal from a measurement while drilling (MWD) tool, wherein the mud pulse signal comprises data;
  decode, using a trained machine learning model, the data to determine a value of the data; and
  provide a user interface comprising the value of the data for presentation on a computing device of a user.

Clause 20. A system comprising:
  a memory device storing instructions; and
  a processing device communicatively coupled to the memory device, wherein the processing device executes the instructions to:
    receive a mud pulse signal from a measurement while drilling (MWD) tool, wherein the mud pulse signal comprises data;
    decode, using a trained machine learning model, the data to determine a value of the data; and
    provide a user interface comprising the value of the data for presentation on a computing device of a user.

What is claimed is:

1. A method for using a trained machine learning model to classify mud pulse signals, the method comprising:
  receiving a mud pulse signal from a measurement while drilling (MWD) tool, wherein the mud pulse signal comprises data;
  decoding, using the trained machine learning model, the data to determine a value of the data;
  providing a user interface comprising the value of the data for presentation on a computing device of a user;
  providing a second user interface for presentation on the computing device of the user, wherein the second user interface presents a graphical element for identifying where a synchronization signal is located in the mud pulse signal;

receiving, from the computing device, a message identifying where the synchronization signal is located in the mud pulse signal; and retraining, using the message, the trained machine learning model to classify the data in the mud pulse signal by identifying the synchronization signal, such that the trained machine learning model identifies subsequent synchronization signals in subsequent mud pulse signals based on where the synchronization signal is located in the mud pulse signal.

2. The method of claim 1, wherein the user interface presents the value of the data in a first graphical element and concurrently presents a second graphical element capable of enabling confirmation of whether the value is valid or invalid.

3. The method of claim 2, further comprising:

receiving, from the computing device, a message classifying the value as valid or invalid, wherein the message is transmitted from the computing device in response to the second graphical element being utilized; and updating, based on the message, the trained machine learning model to classify the data in the mud pulse signal as representing the value, such that the trained machine learning model decodes, based on the message, a subsequent mud pulse signal that is similar to the mud pulse signal.

4. The method of claim 1, wherein the trained machine learning model is trained using a dataset comprising inputs including a plurality of signals representing mud pulse signals and target outputs including a plurality of values representing data of the plurality of signals.

5. The method of claim 1, further comprising controlling, based on the value of the data, the MWD tool to modify an operating parameter in real-time or near real-time, wherein the operating parameter comprises a pulse width of transmitted telemetry signals, a data rate of the transmitted telemetry signals, or some combination thereof.

6. The method of claim 1, wherein the trained machine learning model is trained to decode the data based on training data comprising a plurality of slots, wherein each slot of the plurality of slots represents a value when a respective mud pulse signal is detected in the slot.

7. The method of claim 1, wherein the decoding further comprises:

using a plurality of trained machine learning models to decode the data to determine a plurality of values of the data; and determining the value of the data based on one or more criteria associated with the plurality of values of the data, the one or more criteria comprising (i) a majority of the plurality of values that match, (ii) a weighted sum, (iii) a non-linear evaluation function, (iv) a low-pass filter, (v) a determination of how close the value is to a prior value, (vi) a fuzzy logic selection, or some combination thereof.

8. The method of claim 1, wherein the user interface comprises a graphical element that enables repositioning at least a portion of the mud pulse signal into a slot that causes the value of the data to be modified.

9. The method of claim 1, wherein the mud pulse signal is received by a pressure transducer coupled to a data acquisition system, and the mud pulse signal is transmitted by the data acquisition system to a surface processor that relays the mud pulse signal to a cloud-based computing system capable of decoding, using the trained machine learning model, the data included in the mud pulse signal.

10. The method of claim 9, wherein, prior to relaying the mud pulse signal to the cloud-based computing system, the surface processor determines whether one or more characteristics of a network satisfy one or more thresholds.

11. The method of claim 10, wherein, responsive to determining the one or more characteristics of the network satisfy the one or more thresholds, the surface processor transmits the mud pulse signal to the cloud-based computing system.

12. The method of claim 10, wherein, responsive to determining the one or more characteristics of the network do not satisfy the one or more thresholds, the surface processor downsamples, compresses, or both the mud pulse signal to generate a modified mud pulse signal and transmits the modified mud pulse signal to the cloud-based computing system.

13. The method of claim 9, wherein, prior to relaying the mud pulse signal to the cloud-based computing system, the surface processor determines whether the cloud-based computing system is available.

14. The method of claim 1, wherein decoding, using the trained machine learning model, the data to determine the value of the data comprises:

inputting the mud pulse signal into a filter container comprising a plurality of paths, wherein the plurality of paths comprise:
a first path including a filter component and a first decoder component,
a second path including a machine learning signal filter component and a second decoder component,
a third path including a machine learning decoder component, or
some combination thereof.

15. The method of claim 14, further comprising:

generating, from the plurality of paths, a plurality of values of the data; and determining, using a multi-path voting matrix component, the value of the data based on the plurality of values, wherein the determining comprises:
identifying a plurality of confidence levels associated with the plurality of paths, and
selecting the value of the data generated by one of the plurality of paths based on its respective confidence level.

16. The method of claim 15, wherein the multi-path voting matrix component uses a second machine learning model trained to determine, based on the plurality of confidence levels, the value of the data from the plurality of values.

17. The method of claim 14, wherein:

the decoder component receives the mud pulse signal as a filtered continuous input signal and identifies a highest peak of the filtered continuous input signal within a packet window to determine the value of the data, the machine learning signal filter component receives the mud pulse signal as an unfiltered continuous input signal and outputs the filtered continuous signal, and the machine learning decoder component receives the mud pulse signal as the unfiltered continuous input signal, filters the unfiltered continuous input signal, and outputs a decoded bitstream representing the value of the data.

18. A system comprising:

one or more memory devices storing instructions; and one or more processing devices communicatively coupled to the one or more memory devices and configured to execute the instructions to:
  receive a mud pulse signal from a measurement while drilling (MWD) tool, wherein the mud pulse signal comprises data;
  decode, using a trained machine learning model, the data to determine a value of the data;
  provide a user interface comprising the value of the data for presentation on a computing device of a user;
  provide a second user interface for presentation on the computing device of the user, wherein the second user interface presents a graphical element for identifying where a synchronization signal is located in the mud pulse signal;
  receive, from the computing device, a message identifying where the synchronization signal is located in the mud pulse signal; and
  update, using the message, the trained machine learning model to classify the data in the mud pulse signal by identifying the synchronization signal, such that the trained machine learning model identifies subsequent synchronization signals in subsequent mud pulse signals based on where the synchronization signal is located in the mud pulse signal.

19. One or more tangible, non-transitory computer-readable media storing instructions that, when executed, cause one or more processing devices to:
  receive a mud pulse signal from a measurement while drilling (MWD) tool, wherein the mud pulse signal comprises data;
  decode, using a trained machine learning model, the data to determine a value of the data; and
  provide a user interface comprising the value of the data for presentation on a computing device of a user;
  provide a second user interface for presentation on the computing device of the user, wherein the second user interface presents a graphical element for identifying where a synchronization signal is located in the mud pulse signal;
  receive, from the computing device, a message identifying where the synchronization signal is located in the mud pulse signal; and
  update, using the message, the trained machine learning model to classify the data in the mud pulse signal by identifying the synchronization signal, such that the trained machine learning model identifies subsequent synchronization signals in subsequent mud pulse signals based on where the synchronization signal is located in the mud pulse signal.

* * * * *